United States Patent
Mavros et al.

(10) Patent No.: US 11,890,655 B2
(45) Date of Patent: Feb. 6, 2024

(54) TRANSMISSION ARRAY FOR DRAIN CLEANER

(71) Applicant: Ridge Tool Company, Elyria, OH (US)

(72) Inventors: Nicholas Christopher Mavros, Columbia Station, OH (US); Jeffrey Szucs, Columbia Station, OH (US); Jeff Albertini, Bay Village, OH (US); Alex Michael Cole, Columbia Station, OH (US)

(73) Assignees: Jetter Pro Inc., Hamilton, MI (US); Ridge Tool Company, Elyria, OH (US)

( * ) Notice: Subject to any disclaimer, the term of this patent is extended or adjusted under 35 U.S.C. 154(b) by 381 days.

(21) Appl. No.: 17/207,850

(22) Filed: Mar. 22, 2021

(65) Prior Publication Data
US 2021/0291238 A1    Sep. 23, 2021

Related U.S. Application Data

(60) Provisional application No. 62/993,174, filed on Mar. 23, 2020.

(51) Int. Cl.
| | | |
|---|---|---|
| G01B 7/14 | (2006.01) | |
| B08B 9/045 | (2006.01) | |
| F16L 55/48 | (2006.01) | |
| F16L 101/12 | (2006.01) | |
| F16L 101/30 | (2006.01) | |

(52) U.S. Cl.
CPC .......... B08B 9/045 (2013.01); F16L 55/48 (2013.01); *F16L 2101/12* (2013.01); *F16L 2101/30* (2013.01)

(58) Field of Classification Search
CPC ...... G01D 5/145; B08B 9/043; B08B 9/0433; B08B 9/045; B08B 9/047; B08B 9/0495; B08B 9/0497; B08B 9/051; B08B 9/053; B08B 9/055
See application file for complete search history.

(56) References Cited

U.S. PATENT DOCUMENTS

| | | | |
|---|---|---|---|
| 4,475,820 A | 10/1984 | Mulligan | |
| 5,243,128 A | 9/1993 | Marcoz | |
| 5,636,648 A | 6/1997 | O'Brien et al. | |
| 7,298,126 B1 | 11/2007 | Olsson et al. | |
| 8,444,567 B2 | 5/2013 | Satoh | |
| 8,814,709 B2 | 8/2014 | Berger et al. | |
| 8,968,107 B2 | 3/2015 | Rapp et al. | |
| 10,160,232 B1 | 12/2018 | Griffin et al. | |
| 10,841,465 B1 | 11/2020 | Dvorsky | |
| 2006/0151766 A1* | 7/2006 | Jackson | B66D 1/48 254/276 |
| 2012/0203501 A1* | 8/2012 | Gress | B08B 9/045 702/151 |
| 2018/0038093 A1* | 2/2018 | Olsson | E03C 1/302 |
| 2019/0162558 A1* | 5/2019 | Schmauder | B08B 9/045 |
| 2021/0008697 A1 | 1/2021 | Mueckl et al. | |
| 2021/0041348 A1 | 2/2021 | Parrott et al. | |

\* cited by examiner

*Primary Examiner* — Thang X Le
(74) *Attorney, Agent, or Firm* — Mark Bandy; Rankin Hill & Clark, LLP

(57) ABSTRACT

Systems for energizing a drain cleaning cable within a drain line or other region of interest are described. A signal transmitter on an end portion of the cable enables the cable end portion to be sensed or located when in a pipe or conduit underground. Also described are electrically conductive drivetrains for transferring rotary power.

15 Claims, 14 Drawing Sheets

TRANSMISSION ARRAY FOR DRAIN CLEANER

CROSS REFERENCES TO RELATED APPLICATIONS

This patent application claims priority from U.S. provisional patent application Ser. No. 62/993,174 filed Mar. 23, 2020. While not claiming priority, this application is related by drain cleaning subject matter to U.S. Ser. No. 16/420,383 filed May 23, 2019.

FIELD

The present subject matter relates to equipment and accessories involving devices that sense, identify and/or locate tree roots and other obstructions generally found in found in sewers and pipelines, whether located underground or through walls. Devices of the present subject matter are thus distinguishable from devices that employ inspection cameras or camera heads used in connection with remote viewing systems as disclosed in U.S. Pat. No. 10,841,465 to Dvorsky. The present subject matter, which includes a contact-type of sensor, is thus also distinguishable from a device that uses a non-contact type of sensor, as disclosed in US Patent Application 2021/0008697 to Mueckl et al. In summary, the present subject matter is particularly suited for use in connection with drain cleaning systems, and equipment used for cleaning out drains.

BACKGROUND

Sewer cleaning apparatus and devices are well known. See, e.g., U.S. Pat. No. 5,243,128 to Marcoz and U.S. Pat. No. 5,636,648 to O'Brien et al. It is also known in the fields of drain cleaning and/or inspection, to insert a video camera or camera head into a drain line and then monitor the output of the camera or camera head, as either one is moved within a drain line. See, e.g., U.S. Pat. No. 10,841,465 to Dvorsky and assigned to Ridge Tool. This practice is often advantageously used to visually assess blockage(s) and/or obstruction(s) within the drain line. It is also known to utilize one or more signal generating devices or sondes which transmit their location within a drain line or other region of interest such as underground pipe or conduit. See, e.g., U.S. Pat. No. 7,298,126 to Olsson et al. Typically, such transmission occurs via select sonde radio frequencies. A "sonde" (also called a transmitter, beacon or duct probe) can, e.g., be used to locate buried pipes, conduits, horizontal directional drills and reservoirs. The currently known sondes typically include a coil of wire wrapped around a ferromagnetic core. The coil is energized at a desired frequency, typically in a range of approximately 4 Hz to 500 kHz. A conventional sonde will generate a different electromagnetic field than that produced by an energized line. Locator devices receiving and/or sensing sonde transmission can thus be used to identify the location of the sonde as well as the location of a drain line.

Various types of thin wires, or strands, suitable for producing flexible shafts are known. See, e.g., U.S. Pat. No. 8,814,709 to Staniszewski et al. In addition, flexible, elongated drive transmitting shafts are also known. See, e.g., U.S. Pat. No. 8,968,107 to Rapp et al. Also known is electrically energizing a cable or other flexible member while extending such a cable or flexible member within a drain line. Such extension of cable or other flexible member enables sensing of resulting magnetic fields generated along the entire length, or predetermined portion, of energized cable or member in the line.

These technologies have also been used in combination. Inspection camera push cables can be energized to follow the length of line during locating. This allows for mapping of the push cable path above ground. Although satisfactory in many respects, a need still remains for improved systems for inspecting and/or mapping drain lines.

SUMMARY

Various problems associated with such known approaches for inspecting and/or mapping drain lines will be addressed throughout this present application.

In one aspect, the present subject matter provides a system for determining location of a conduit, a pipe or other fluid-transport member. The system comprises a drain cleaning machine. The drain cleaning machine comprises a rotatable drum, a source of rotary power, an input component for receiving rotary power, and a sheathed cable extendable from and retractable into the drain cleaning machine. The cable thus comprises an inner member and an outer sheath surrounding the member. The inner member can be an elongated shaft of metal or other suitable material, or an elongated plurality of coils of tightly wound wire or other suitable material. With the sheathed cable operatively connected to the input component, so the input component receives rotary power, the inner shaft or member rotates about an axis. However, the sheath does not rotate about the axis. The system of the present subject matter further includes a signal transmitter electrically connected to the input component of the drain cleaning machine.

As yet another feature or aspect, the present subject matter provides an electrically conductive drivetrain comprising an input component for receiving rotary power as well as for receiving an electrical signal. The drivetrain includes a first drive member and a second drive member, wherein the first drive member is configured and operatively associated with the input component for transferring rotary power and the electrical signal from the input component to the second drive member. The drivetrain further includes a coupling configured to receive an end portion of a cable having an inner member rotatable about an axis. The cable includes an outer sheath surrounding the inner member. An inner member or core of the present subject matter is electrically conductive and can be made from an elongated shaft of metal or other suitable material, or an elongated plurality of coils of tightly wound wire or other suitable material. Flexible shafts manufactured from of coils of electrically conductive wound wire are well known. See U.S. Pat. No. 4,475,820 to Mulligan. Conventional flexible metallic conduit can, e.g., be made by a known FMC process involving helical coiling of a self-interlocked ribbed strip of aluminum or steel, for forming a hollow tube through which wires can be pulled. In addition, so-called "metal rubber" is a conventional description or informal name for several conductive plastic polymers containing metal ions, produced by Nano-Sonic, Inc, in cooperation with Virginia Tech. Nanocomposite materials (made by them) are said to be flexible and durable to high and low pressures, temperatures, tensions, and most chemical reactions; and are also said to retain all of their original physical and chemical properties upon being returned to a ground state. The coupling of the present subject matter, however, differs from such prior art, since said coupling transfers rotary power as well as an electrical signal from a second drive member to the cable inner member.

As a further aspect or feature, the present subject matter additionally provides a method for determining the location of underground conduit, pipe, or other generally inaccessible constructs. The method comprises providing a system comprising a drain cleaning machine having a rotatable drum, an input component for receiving rotary power from a source, and a cable extendable from and retractable into the machine. The cable includes an inner member operatively associated with the input component and rotatable about an axis. The cable further includes an outer sheath extending about the inner member. When the power source causes the input component to rotate, the inner member rotates about the axis, however, the sheath does not. The system also comprises an electrical transmitter in electrical communication with the input component of the drain cleaning machine. The electrical transmitter transmits a controlled electrical signal enabling a user of the drain cleaning machine to determine, e.g., the location of underground conduit, pipe, or other generally inaccessible fluid flow constructs. The input component of the drain cleaning machine is in electrical communication with the inner member of the sheathed cable for achieving controlled transmission of the signal. The method also comprises actuating or activating the electrical transmitter to thereby energize the inner member of the sheathed cable; and the method includes deactivating the transmitter. The method also includes sensing an electromagnetic field emanating from the energized inner member; and includes providing the field information to a user.

As can be appreciated by those skilled in the art, the subject matter described herein is capable of many other embodiments. The following details can, for example, be modified in many respects, without departing from the spirit and scope of the claims. As a result, the drawings and description are to be viewed as illustrative and not limiting.

DETAILED DESCRIPTION OF THE EMBODIMENTS

Figure 1:
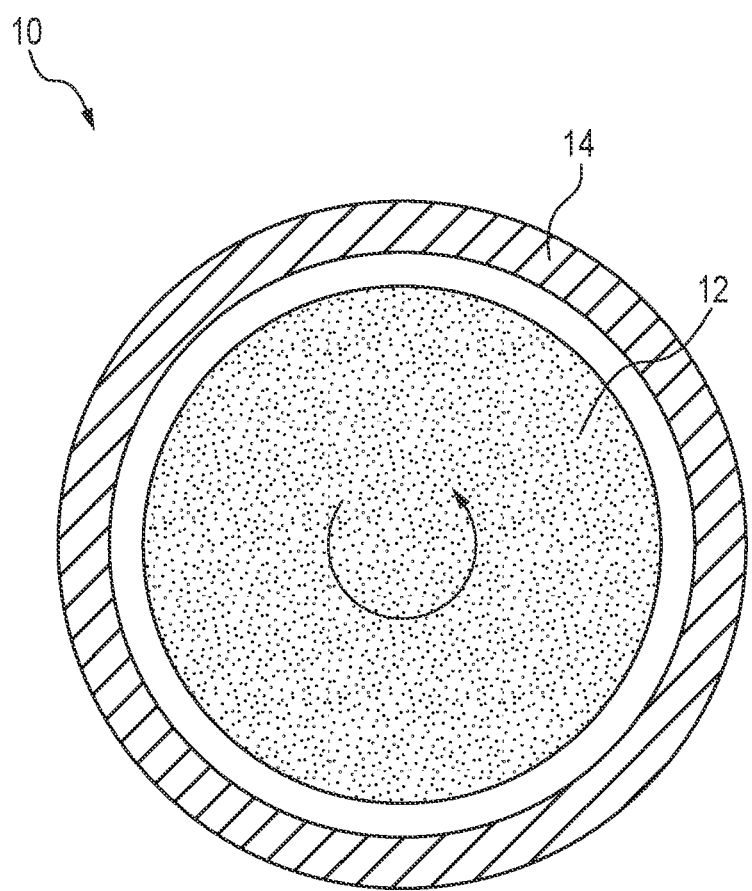
FIG. 1 is a schematic cross sectional view of a typical sheathed cable.

Conventional camera push cables can be electrically energized to produce a strong electromagnetic signal which can be detected with a locator when such camera push cables are operational. However, known drain cleaning cables, when energized, produce a relatively weak electromagnetic signal and are therefore not easily located. Therefore, to locate a drain line during a drain cleaning operation, a drain cleaning cable would have to be removed from the drain line, and a camera push cable placed in the drain line to be located. Such a camera push cable would then need to be energized before, during, or after extending the camera push cable into the drain line, after which an energized push cable could then be located using a conventional locator capable of sensing electromagnetic fields. Such operations are disadvantageous, as they involve additional time and effort and can result in unnecessary damage or wear to equipment.

In accordance with the present subject matter, a conventional machine such as a drain cleaning machine, which can be configured to perform select drain cleaning operations can be used to locate underground conduits, pipes, or other inaccessible fluid flow constructs, to show features and advantages of the present subject matter. Locating such underground or otherwise inaccessible constructs enables an operator to avoid the above-noted operational steps of removing drain cleaning cable from drains, and substituting that cable with a camera push cable for performing construct-locating operational steps. Generally, an energized line or output from an electrical transmitter is connected to an input component of a drain cleaner. The input component receives rotary power from a powered source such as an electric motor or powered hand drill. A typical drivetrain of the drain cleaning machine of the present subject matter comprises electrically conductive material extending from the input component to a drain cleaning cable. An embodiment of such drain cleaning cable for the present subject matter is a sheathed cable, capable of transmitting an electrical signal from the transmitter entirely through the cable. The resulting electromagnetic signal emanating from the energized cable is then monitored using conventional locators capable of sensing electromagnetic fields. The drain cleaning cable can be made of sheathed cable, as described herein.

Such drain cleaning cables can be energized using commercially available line transmitters. Such drain cleaning cables can also be energized while most of the cable or only a portion of the entire length is located in a drain line. For instance, many line transmitters commercially available under the designation RIDGID can successfully be used. Nonlimiting examples of such line transmitters include but are not limited to RIDGID ST-33Q+ Line Transmitter, RIDGID ST-305 Line Transmitter, RIDGID 305R Line Transmitter, and RIDGID ST-510 Line Transmitter. These line transmitters induce or apply a predetermined electrical current onto a target line. Such line transmitters and others, are successfully used to energize sheathed cables, as described in detail herein.

The signal transmitter can advantageously be connected to the drain cleaning machine through a bearing or lug in such a way that allows the drain cleaning cable, for example the sheathed cable mentioned above, to be spinning with the transmitter clip or other suitable assembly attached. These aspects are described in greater detail herein.

Such an energized line, such as the sheathed cable mentioned above, can be extended into a drain line of interest, can be energized, and thereafter can be located or otherwise assessed using commercially available locators. Line locators commercially available under the RIDGID designation are capable of being used for such purposes. Nonlimiting examples of such locators include but are not limited to RIDGID SR-24 Line Locator, RIDGID SeekTech SR-60 Locator, and RIDGID SeekTech SR-20 Locator.

Drain Cleaning Machines

The present subject matter provides drain cleaning machines, apparatuses, and systems comprising a drum housing used in connection with known drain cleaning cables. The drum housing serves to store and/or retain the drain cleaning cable and may additionally promote dispensing and/or retraction of the cable. The drum housing also includes a cable carrier mounted rotatably about an axis in the interior of the drum housing. The drain cleaning apparatuses and systems also comprise a transmission assembly for transferring rotary power from a power source to the drain cleaning cable.

Flexible drain cleaning cable, generally referred to as sheathed cable in this application, comprises a flexible inner member surrounded by a flexible outer sheath. The inner member is rotatable about an axis, while the sheath remains stationary. Thus, the inner member is rotatable by a power source such as a powered hand drill about the axis. However, the sheath surrounding the inner member does not rotate about the axis. FIG. 1 schematically illustrates a typical sheathed cable 10. FIG. 1 shows a cross section of a rotating inner member 12 surrounded by a non-rotating outer sheath 14. Due to the fact that the outer sheath 14 does not rotate with the inner member 12, this provides a convenient contact region for a user to control and manipulate the cable 10.

Figure 9:
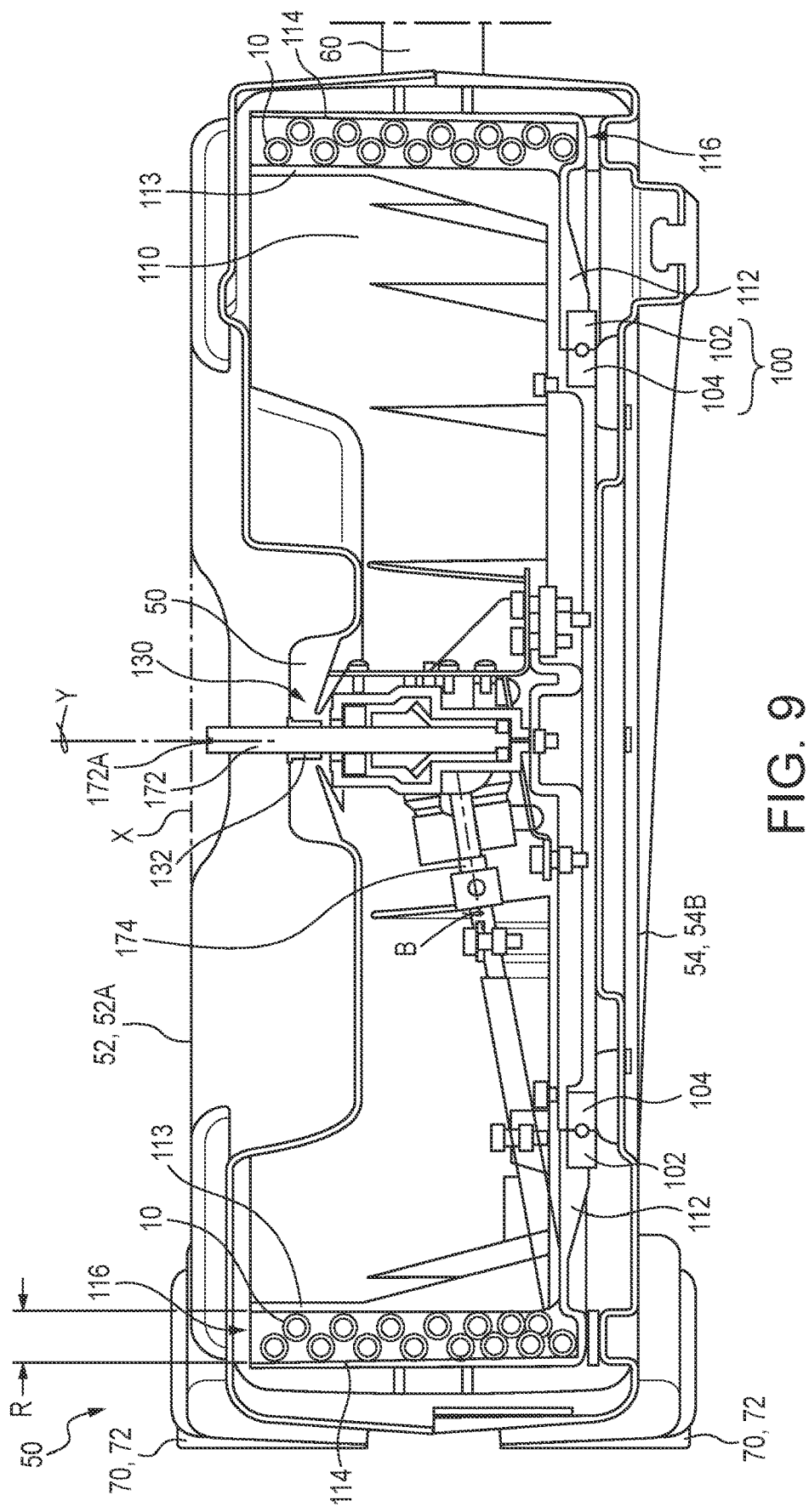
FIG. 9 is a partially fragmented cross sectional view of select components of an illustrative example of the drain cleaning apparatus of the present subject matter.

The cable 10 of the present subject matter also reduces wear on the internal surfaces of the drum housing 50, for the reason that the outer sheath 14 acts as a wear barrier between the drum housing 50 and the rotating cable 10 (see FIGS. 1 and 9). The term "internal surfaces of the drum housing 50" refers to internal surfaces of the drum housing 50 that are contacted by, or potentially contacted by, the flexible drain cleaning cable 10. Because the rotating inner member 12 (FIG. 1) does not directly contact the interior surfaces of the drum housing 50, it is expected this may promote longer life for the drum housing 50. Additionally, since the exterior surface of the sheath 14 is smooth, it is easier to wipe contaminates and drain waste from the exterior surface of the sheath, which advantageously promotes a cleaner operation for users. Additional cleanliness benefits result from the sheath 14 surrounding the rotating member 12. Conventional exposed wound cables retain water and debris that can spin off during cable rotation.

The drain cleaning machine of the present subject matter further includes a rotary power transmission assembly to which a rotary power source such as a powered hand drill can be operatively engaged. An illustrative transmission assembly is capable of effectively transmitting rotational motion from the powered hand drill ("power drill") or alternative power source directly to an input for the transmission assembly which could be a flexible shaft or other input component for the transmission assembly, as described in greater detail herein. The transmission assembly could further include provisions for selectively transferring power from the power drill or other power source to the cable 10. An illustrative example of such provisions could be a power control switch. Providing a such a power control switch to the drain cleaning machine of the present subject matter, gives a typical user greater control and more precise control of the cleaning process.

The cable carrier is configured to rotate within the stationary drum housing, in such a way that the cable carrier is not in direct contact with the user. This helps reduce the occurrence of pinch points whenever the drain cleaner is being used or transported.

In addition, a drain cleaning machine of the present subject matter provides an improved ergonomic interface between the user and the machine. This provides an additional utility to a drain or sewer cleaning user, as described in greater detail herein.

The present subject matter also provides professionals and lay persons with improved methods for cleaning drains. Such methods could become desirable over methods that use known devices including drum machines, sectional machines, jetters, hand powered devices, or drill powered devices for cleaning drains, pipes, and tubes.

In comparison to traditional cleaning machines, the present subject matter enables effective cleaning though the use of high RPM, low torque applications. The term "high RPM" as used herein refers to a rotational speed of the drain cleaning cable within a range of from about 1,000 RPM to about 4,000 RPM (revolutions per minute). However, it will be understood that the present subject matter is not limited to these operational rotation speeds and includes rotational speeds less than about 1,000 RPM and/or greater than about 4,000 RPM.

The so-called "end effectors" otherwise generally referred to as or cleaning tools typically utilized with drain cleaning operations are designed to abrade or "mill" away debris within the environment that is to be "cleaned," as opposed to tools used in operations and applications based on slower rotational speeds and higher torque in which such tools are designed to bite into a blockage to be displaced. The illustrative drain cleaning system uses fittings and/or cleaning tools made to conform to the inside of pipe being cleaned. The benefit with such fittings is that they are capable of cleaning within a range of pipe diameters. This is advantageous for those applications where a user must go through a smaller pipe cleanout to gain access to a blockage in a larger pipe. Such fittings are also effective when multiple pipe diameters are to be cleaned.

An additional feature of the devices, apparatuses, and systems of the present subject matter is the ability of the illustrated drain cleaning machine being powered by a battery operated hand held drill, thereby providing greater flexibility and versatility to a user. In many embodiments, the input component or shaft of a transmission assembly is centrally located within the drum housing. After a desired length of the drain cleaning cable is retracted or pulled from the drum housing and, for example, a battery powered hand held drill or other rotary power source is connected to the input component or shaft of the transmission assembly, the rotary power source remains stationary relative to the drum housing whenever the drum housing is relocated by the user. This permits only localized or selective cleaning of only desired region(s) of a pipe interior, if desired. In contrast, conventional jetter systems must clean the entire length of a pipe interior.

Additional advantages, features, and other aspects and details of the drain cleaning machines and systems of the present subject matter include the following.

Drum Housing

The drum housing of the present subject matter provides an interior region within which the drain cleaning cable is stored or retained during non-use. While the illustrated drum housing is partially or entirely cylindrically shaped, the present subject matter is not limited to cylindrical shapes, and includes an assortment of other shapes and configurations. In certain situations, e.g., a drum housing could be configured to be horizontally disposed when in use, and to typically be disposed vertically when stored. For such cases, the term "horizontal" refers to a plane of a front face of a drum housing being oriented generally horizontal or parallel relative to a floor or surface; and the term "vertical" refers to the plane of the front face of the housing oriented generally vertical.

Figure 2A:
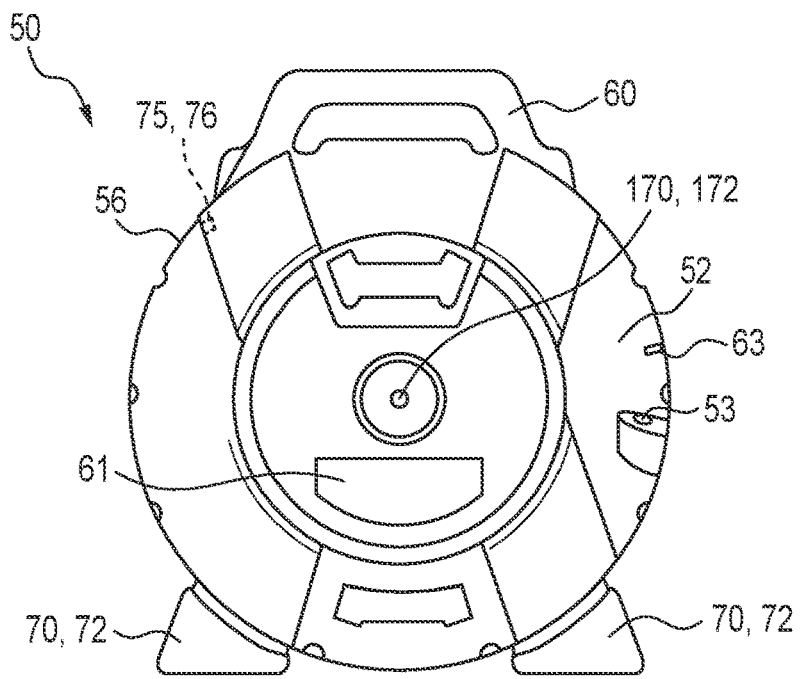
FIG. 2A is front view of an embodiment of a drum housing of a drain cleaning machine or apparatus in accordance with the present subject matter.
Figure 2B:
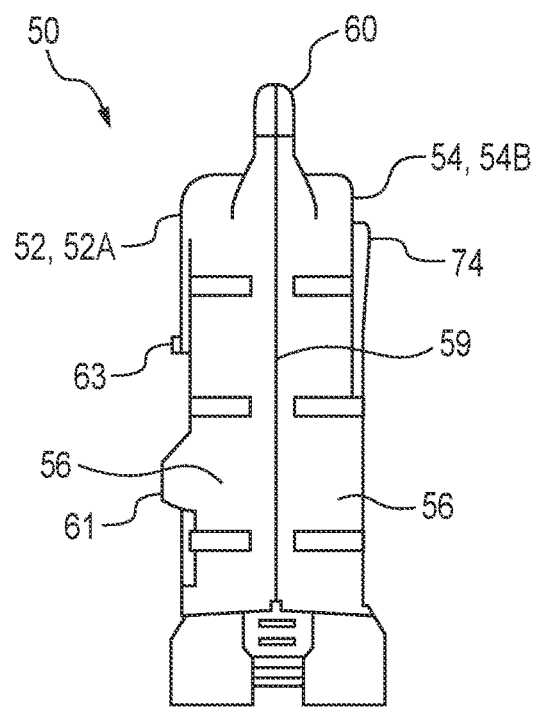
FIG. 2B is a side view of the drum housing depicted in FIG. 2A.

The drum housing can be formed from injection-molded polymeric materials. Moreover, a drum housing can be manufactured to resemble a clamshell configuration. In such versions, the drum housing comprises front and back components, which may or may not be identical. FIGS. 2A and 2B illustrate an embodiment of a drum housing 50 in accordance with the present subject matter. The drum housing 50 includes a front wall 52, an oppositely directed rear wall 54, and a generally circumferential side wall 56 extending between the front and rear walls 52, 54. In the particular version shown in the referenced figures, the drum housing is formed from a front component 52A and a rear component 54B which contact and engage each other along an interface 59 that generally bisects the drum housing 50. The drum housing 50 also defines a cable port 53 through which the drain cleaning cable 10 (FIG. 9) could extend. The cable port 53 provides access into the interior of the drum housing 50. The cable port 53 can include a protective insert which can serve to protect against wear on the drum housing 50 as the drain cleaning cable 10 is advanced or retracted relative to the drum housing 50. Such protective insert may, e.g., be formed from a material exhibiting a relatively low coefficient of friction. Moreover, in certain versions, such material exhibits a coefficient of friction that is less than the coefficient of friction of the material of the drum housing. In particular versions, the inner span or opening, i.e., inner diameter, of the protective insert is slightly larger than the outer diameter of the drain cleaning cable 10, thereby resulting in the protective insert also providing a wiping function to rid excess liquid or debris on the outer surface of the cable 10 as the cable 10 is retracted into the drum housing 50. The drum housing 50 also optionally advantageously includes a transport handle 60 (FIGS. 2A, 2B and 5A) that typically extends from the side wall 56. The drum housing 50 may also include a secondary transport handle 61 (FIGS. 2A, 2B) provided along an outer face such as on the front wall 52. The drum housing 50 may additionally include a cable retention clip 63 typically provided near the cable port 53. Such a cable retention clip 63 serves to releasably engage a distal end portion or other region of the drain cleaning cable 10. Retaining or holding the cable 10 along the drum housing 50 promotes ease in transporting and storing the drum housing 50 whenever it stores cable 10. Also, a cable carrier 110 located within the drum housing 50 (FIG. 9) is capable of rotating about an axis Y relative to the drum housing 50 (which remains stationary), whenever drain cleaning cable 10 is extended from or retracted into drum housing 50.

Figure 3:
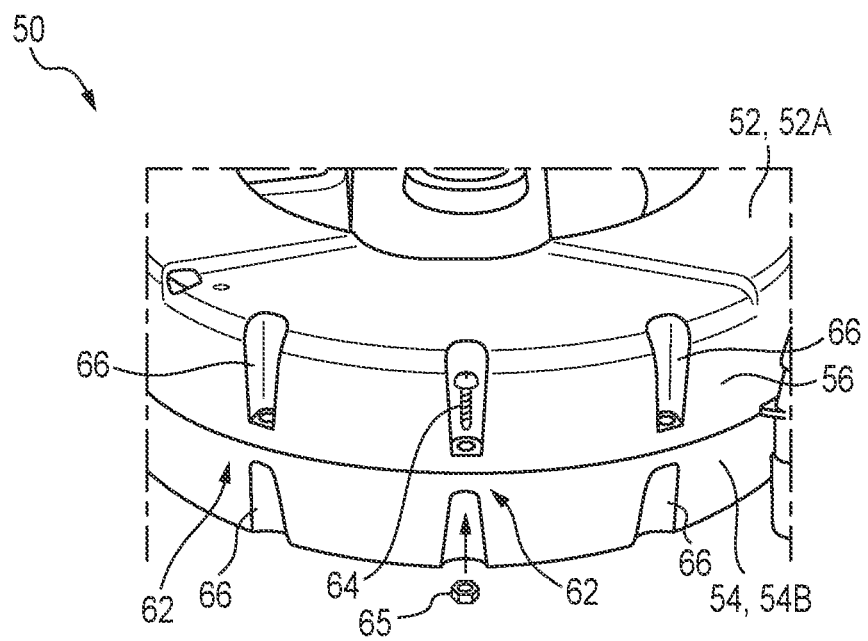
FIG. 3 is a partial perspective view of a region of an external surface portion of the drum housing, illustrating optional threaded fasteners used for the drum housing.

The housing sections, namely, the front and rear components 52A and 54B, are typically held together via fasteners located around the circumference of the drum housing. FIG. 3 shows one embodiment of the fastening configuration, comprised of a bolted joint assembly 62. A bolted joint assembly 62 typically includes a threaded fastener 64 extending between apertured mating wall regions of the front and rear components 52A and 54B. Fastener 64 can engage internal threads in the wall regions or engage a corresponding threaded nut 65 or other suitable fastener. Front and rear components 52A and 54B can define recessed regions 66 for receiving joint assembly 62. The present subject matter also includes alternative assemblies for joining housing components together. Nonlimiting examples include toggle clamps, over-center clamps, slide locks, and similar mechanisms. In addition, alternative fastener configurations and tool-less access methods and conventional components could potentially be utilized.

Figure 4:
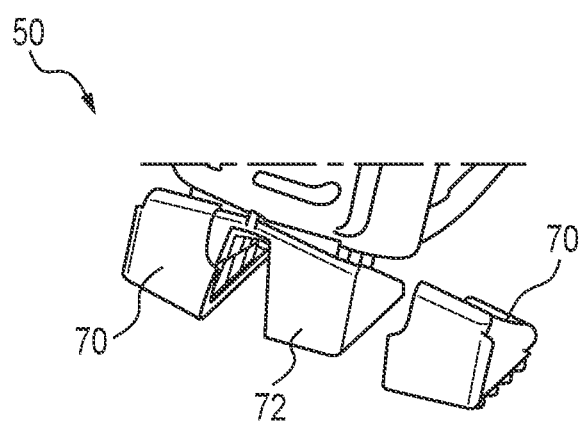
FIG. 4 is a detailed perspective view of optional feet components shown in FIG. 2A and used in a floor-mounting arrangement (FIGS. 2A, 2B) for the drum housing.

Rubberized feet, made from a slip resistant polymeric material, can optionally be provided on the housing. Referring to FIG. 4, suitable feet 70 can cover protrusions or projections 72 located on the drum housing 50. Such feet 70 and/or protrusions 72 would serve to stabilize the drum housing 50. The fit between the feet 70 and housing protrusions 72 would provide sufficient frictional engagement to remain on the housing without the use of fasteners. FIG. 4 depicts such rubberized feet 70 as mating to the protrusions 72 located on the housings, fastened via an interference fit. Typically, such feet 70 are located along a region of the drum housing 50 and in particular the side wall 56 opposite from the handle 60 as depicted in FIG. 2A. However, the present subject matter includes a wide array of varying locations for such feet and/or such handles.

The drum housing 50 may also include a removable drain plug 75 as shown in FIG. 2A that allows users to drain the system of any contaminates found in the drum housing or system. Plug 75 can include a rubber insert, screw, plug, or cap which may or may not be tethered to housing 50 to prevent loss. Once removed, the drum housing 50 is oriented such that liquids or other debris are urged toward an aperture 76 or hole defined in the housing 50 which the plug, screw, insert, or a cap covers during use. In many versions, aperture 76 and associated drain plug 75 are located along a region of the front wall 52 preferably near handle 60, as shown in FIG. 2A. Such a location results in aperture 76 being positioned away from liquid or debris within the interior of the drum housing 50 during use and storage positions of the drum housing. The illustrated drum housing 50 is oriented horizontally, with front wall 52 directed downwardly for drainage. A relatively higher location for the aperture 76 and drain plug 75 prevents inadvertent escape or leakage of liquid or debris from drum housing 50 during use or storage.

Figure 5A:
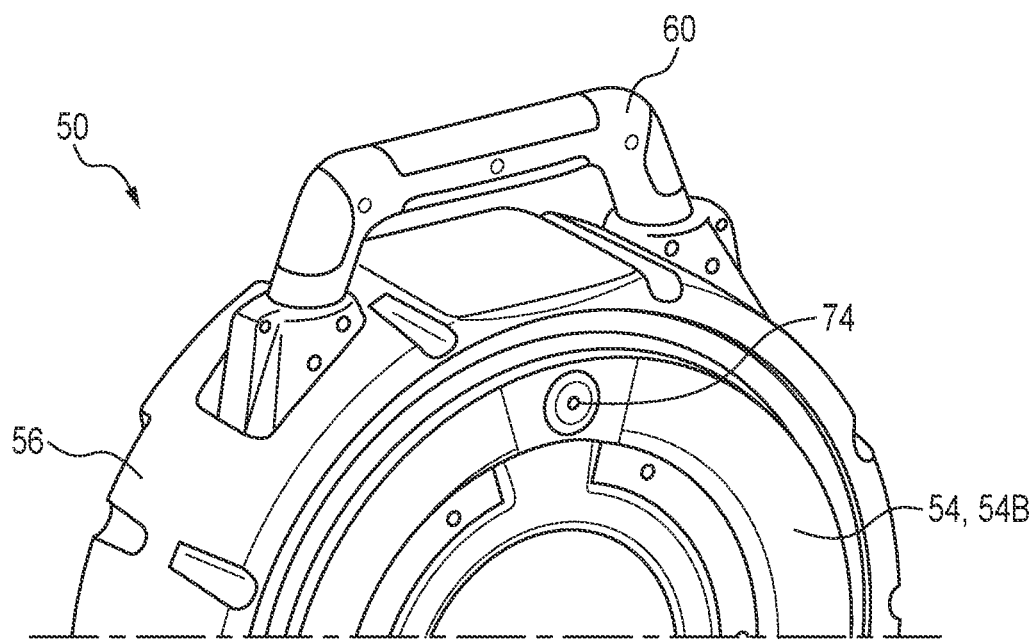
FIG. 5A is a partial perspective view showing an upper region of an exterior surface portion of the drum housing, depicting a handle near a grommet on a rear wall.
Figure 5B:
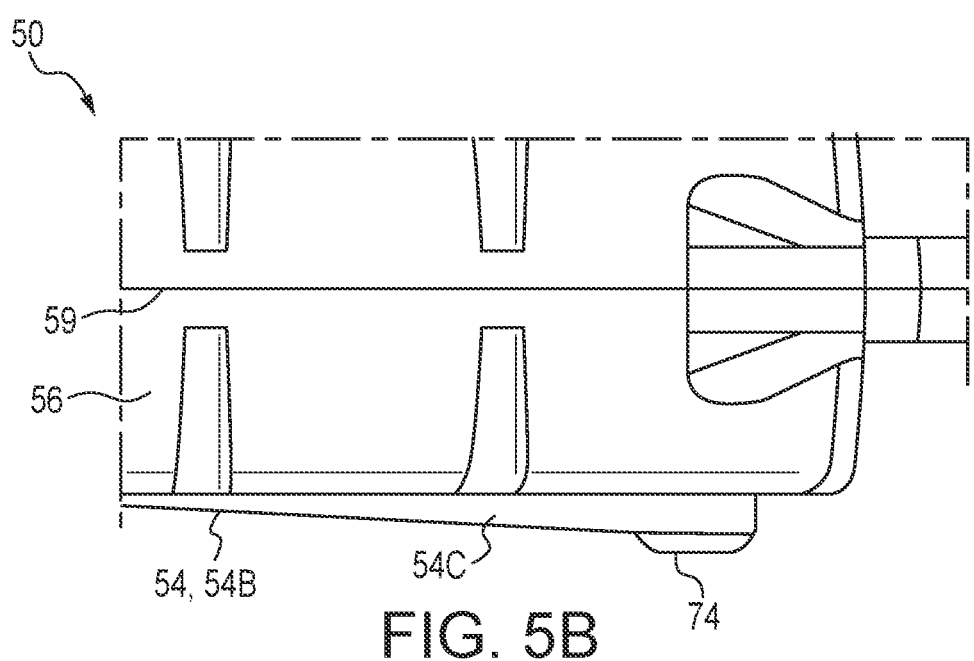
FIG. 5B is a portion of a side elevational view of the housing, depicting an interface bisecting the drum housing, including a grommet extending from a rear wall.

Referring to FIGS. 5A and 5B, in particular versions, one or more grommet(s) 74 or feet may be provided along a rear wall 54 of the drum housing 50. These features of the present subject matter serve to improve storage stability of drum housing 50 and protect any work surface(s) when laid horizontally with its rear wall 54 facing downward.

Drain Cleaning Cable

The drain cleaning cable 10 used in the machines and systems of the present subject matter typically comprises an inner member and an outer sheath surrounding the inner member. Such an inner member can be an elongated shaft of metal or other suitable material, or an elongated plurality of coils of tightly wound wire or other suitable material. Whenever the sheathed cable is operatively connected to an input component, so that the input component receives rotary power from a power source, the inner shaft or member is caused to rotate about an axis. However, the sheath, which doesn't rotate about the axis, remains stationary, relative to the rotating inner member. In operation, a driver end coupling is typically crimped onto the inner member, and at least one collar is crimped on a cable end portion opposite of the driver end. Additional collars may serve to protect cable from damage caused by such components as set-screws, and/or also may serve to provide precise locations for tool spacing as can be appreciated by users.

Figure 6A:
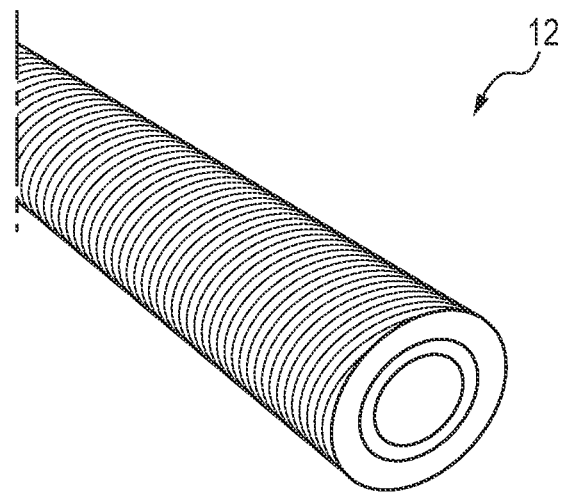
FIG. 6A is a schematic perspective view of an end portion of cable with its outer sheath removed, depicting multiple layers of wire of the rotatable inner member.
Figure 6B:
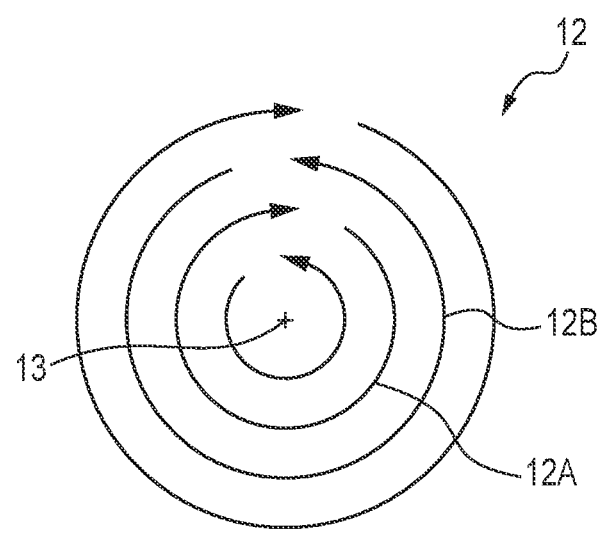
FIG. 6B is a schematic cross section of the sheathed cable of FIG. 6A, illustrating the axially alternating winding directions of the multiple layers of wire.

The drain cleaning cable of the present subject matter, in operation, smoothly transmits torque from a transmission assembly 170 (FIGS. 10-13) to a distal end of the cable 210 (FIG. 15) at which end is located a cleaning attachment or tool 310. As will be understood by those reading this specification, torque transmission is performed by the inner rotatable member of drain cleaning cable 10. For torque transmission purposes, the inner member of drain cleaning cable could comprise a solid metal shaft, or the inner member could comprise a plurality of high tensile strength wires, such as steel, wrapped around an inner core of suitable material. The illustrated drain cleaning cable 10 includes multiple layers (FIGS. 6A, 6B) of wire without an inner core. Multiple layers of wire typically constitute a desired diameter for cable, which also affects the flexibility of the resulting cable, and therefore, the desired range of pipe sizes that such cables are effectively capable of cleaning. Cables or layers thereof, may or may not be wound in opposing directions (FIG. 6B), which is one conventional method used to manufacture cables capable of withstanding torque in the clockwise or counterclockwise direction. FIG. 6A schematically depicts cable layers of wound wire 12 of drain cleaning cable 10 shown in FIG. 1, from which inner cable layers of wound wire 12 the outer sheath 14 is removed. FIG. 6B is a schematic cross section of the internal cable layers of wound wire 12 showing winding layers that are wound around a preceding layer in the opposite direction. Specifically, in many versions, the rotatable inner member of cable 10 (FIG. 1) comprises a plurality of wound wire layers 12. Such a plurality of wound wire layers 12 can, e.g., include a first wire layer 12A wound in a clockwise direction about a center axis 13 of plural layers 12, and a second wire layer 12B wound in a counterclockwise direction about the center axis 13. Such second wire layer 12B is located immediately adjacent the first wire layer 12A. The plural wire layers 12 may advantageously include additional layers. Thus, it will be understood that the present subject matter includes a variety of drain cleaning cables including those using a rotatable shaft disposed within a sheath, and those using a wire-based construction which is rotatable within the sheath.

Figure 7A:
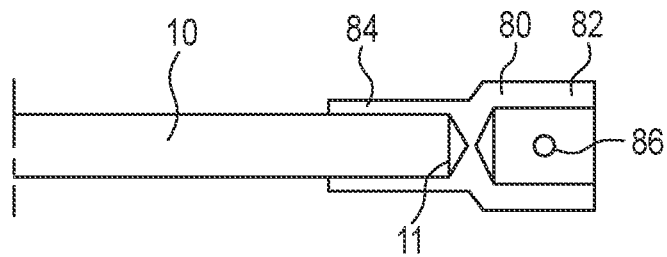
FIG. 7A is a schematic cross sectional view of the driven end portion of a sheathed, electrically conductive cable in accordance with the present subject matter.
Figure 13:
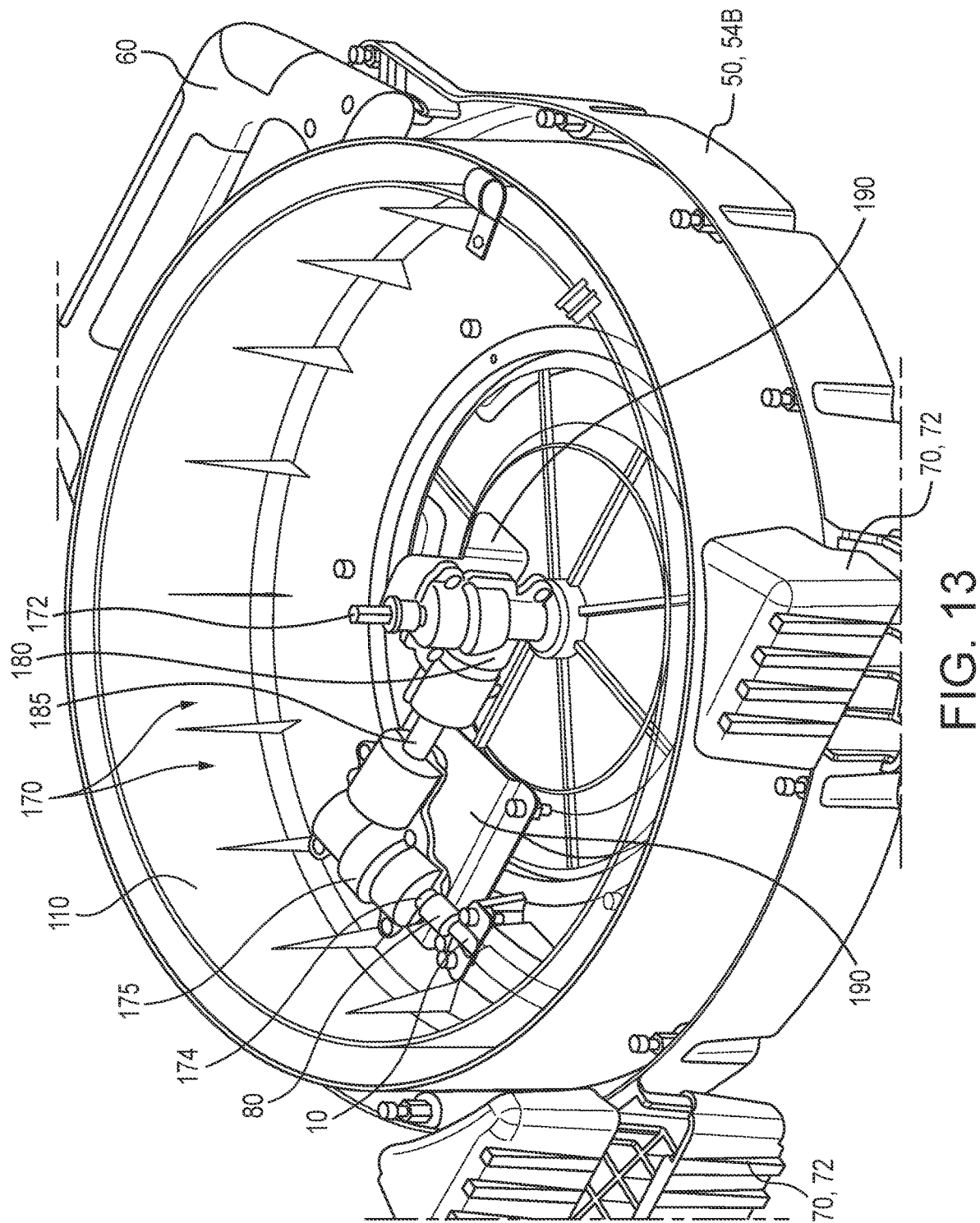
FIG. 13 is a perspective view of an embodiment of the drain cleaner of the present subject matter, depicting location of a cable carrier relative to the housing.

A driven end or input component 172 of the illustrated transmission assembly 170 (FIG. 11) is where mechanical power is transferred from a power source through the transmission assembly 170 to an output component 174 (FIG. 13). A fitting to which the transmission is coupled, and which is typically mechanically crimped onto the drain cleaning cable, comprises a bucket end type of configuration, including an assembly that comprises a shoulder screw, first pin, second or detent pin, and/or a third or shear pin to function as a coupling pin to connect the transmission to the crimped fitting of the drain cleaning cable. FIG. 7A schematically illustrates a cross section of a crimped fitting or coupling 80. Specifically, the fitting 80 is crimped or otherwise engaged to a proximal end 11 of the drain cleaning cable 10. Fitting 80 includes a receiving face or region 82 for receiving a source of rotary power, and a cable receptacle 84 for receiving the proximal end 11 of the cable 10. Region 82 includes a (noted) shoulder screw 86 or suitable coupling pin for securing to the transmission upon engagement therewith. One or more shear pin(s) could be used to limit the torque to which the cable is subjected.

The sheath surrounding the inner member or shaft is typically constructed as a composite consisting of a fibrous membrane of suitable material, typically polymeric, sandwiched between two regions of polymeric materials, that are similar or dissimilar, to the fibrous membrane. Each of the several polymeric materials mentioned are chosen for wear resistance and chemical compatibility, while the polymeric material constituting the fibrous layer is chosen to maximize the tensile strength. The sheath may also be in the form of a single layer. The sheath is typically cut slightly shorter than the length of the inner member or shaft, so that a section of the rotating shaft or cable is exposed on both ends in order to crimp and/or insert fittings for the cleaning system and/or process.

Figure 7B:
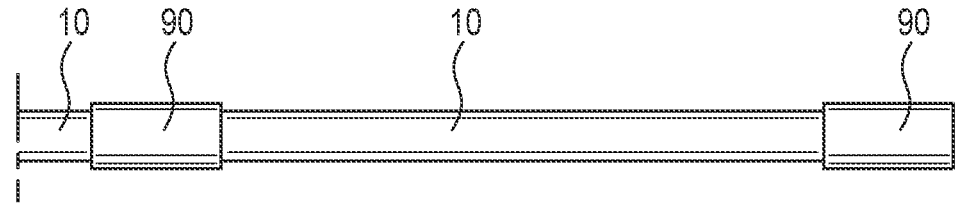
FIG. 7B is a schematic view of sections of sheathed cable joined together.

In certain embodiments of the cleaning cable, cleaning tools may be fastened to an end portion using set screws. To prevent damage to drain cleaning cable, such as fraying from over tightening set screws, collars may be crimped onto the cable for the set screws to engage. Such end tools are designed to slide over the collars, provide a rigid surface for the set screws, and thus serve as a shield for a shaft or individual wires that make up the interior of the cable 10. FIG. 7B schematically depicts plural sections of cleaning cable 10 adjoined or engaged with each other, using collars or unions 90.

The cable assembly of the present subject matter typically also includes an effective amount of lubricant injected between wire core 12 and sheath 14 to reduce friction between sheath 14 and rotatable wire core 12. Wire core 12 soaked in a bath of lubricant allows for thorough penetration of lubricant into gaps between the wire layers.

Typically, when using drain cleaning cable with the machines and systems described in this specification, an appropriate length for the cleaning cable generally depends on an outer diameter (D). For instance, a ¼ inch D, an appropriate length of cable is typically 50 feet. For a 5/16 inch D, the cable length is typically 70 feet. It will be understood that the systems of the present subject matter can utilize a wide range of lengths of drain cleaning cable, including less than 50 feet and greater than 70 feet.

Although the present subject matter is described in conjunction with the illustrated drain cleaning cable, it will be understood that conventional drain cleaning cable within a sheath could potentially be used with the signal transmission systems described in this specification. The present subject matter thus contemplates use of unidirectional cable, as well as a wide array of sheaths and flexible cable enclosures. Such can be used along with, but not limited to, hydraulic or pneumatic tubing or hose, other polymeric materials, non-polymeric materials, composite materials, various metals and metal alloys, and combinations thereof. It is also contemplated that the sheath may include a single layer or multiple layers with or without strengthening membranes.

Provisions for Rotatably Mounting Cable Carrier in Housing

Figure 8:
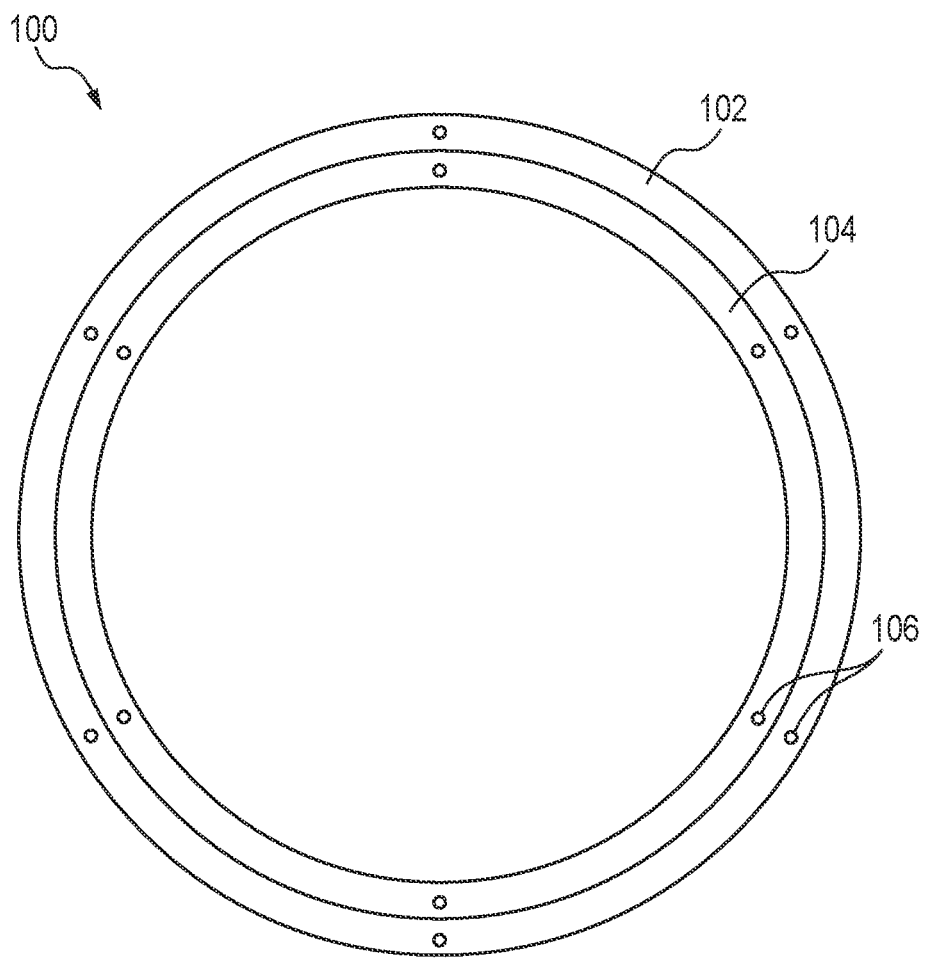
FIG. 8 is a schematic cross sectional view of a bearing assembly, depicting inner and outer races, for the drain cleaning apparatuses of the present subject matter.

In many embodiments of the present subject matter, mounted on the inside of the drum housing 50 (FIG. 10) is a turntable style bearing, or more commonly referred to as a "lazy susan" or slewing ring type bearing. The primary function of such a bearing or bearing assembly is to provide smooth, rotary motion for internally-located drum cable carrier 110, which rotates as cleaning cable 10 is extracted from and retracted into the drum housing 50. FIG. 8 schematically illustrates a typical bearing assembly 100.

The bearing assembly 100 typically comprises two races 102 and 104, with a plurality of ball bearings positioned between the races as rolling elements, which may or may not contain a cage to separate the bearings. In the embodiment depicted in FIG. 8, the bearing assembly 100 comprises outer race 102 and inner race 104. Moreover, the bearing assembly 100 further includes a plurality of ball bearings (not shown) located between the races 102, 104. The inner and outer races may or may not include drilled and tapped holes 106 for attaching the bearing assembly 100 to an interior face of the drum housing 50. Outer race 102 is typically used to support rotatable cable carrier 110.

In certain versions of the present subject matter, holes 106 in both races 102, 104 (which may or not be identical) are formed to provide secure fastening directly to bearing assembly 100 without use of a nut, for preserving minimal internal spacing.

Although various embodiments of the drain cleaning machines and systems, contemplated by the present subject matter, use a lazy susan type bearing assembly for rotatably supporting the cable carrier, it is to be understood that the present subject matter includes various alternative provisions. For example, one or more rollers could be used to rotatably support the cable carrier. In addition, one or more bushings could be utilized. Further, one or more low friction pads, commercially available or of special design, could advantageously be located between the drain cable carrier and the drum housing. Moreover, it will easily be understood by professionals skilled in the art that such provisions could be located along an interior front wall of the drum housing instead of or in addition to locating such provisions along the rear wall of the drum housing.

Cable Carrier

Figure 10:
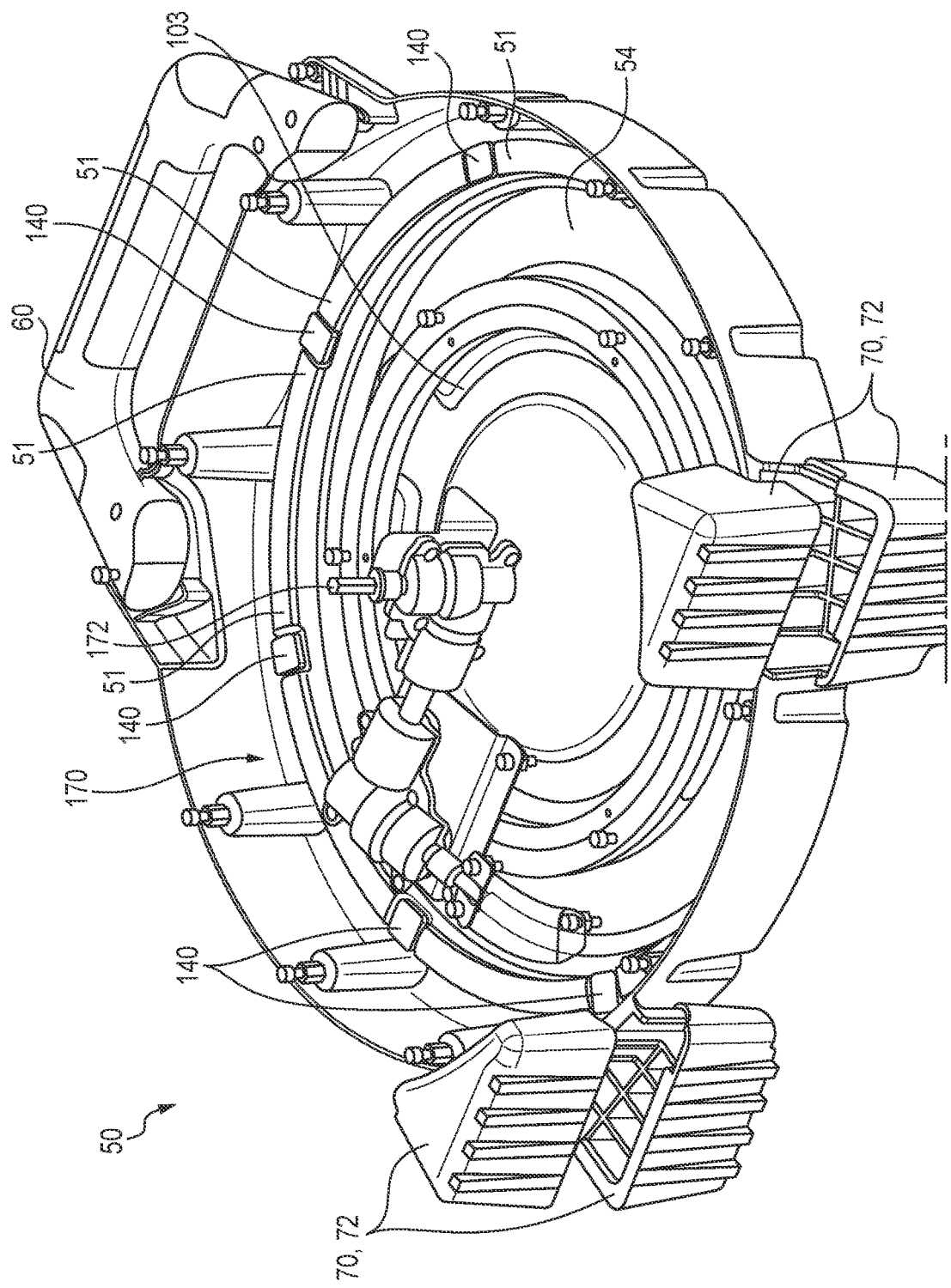
FIG. 10 is a perspective view of the drain cleaning apparatus depicted in FIG. 9, illustrating additional aspects or features of the present subject matter.
Figure 11:
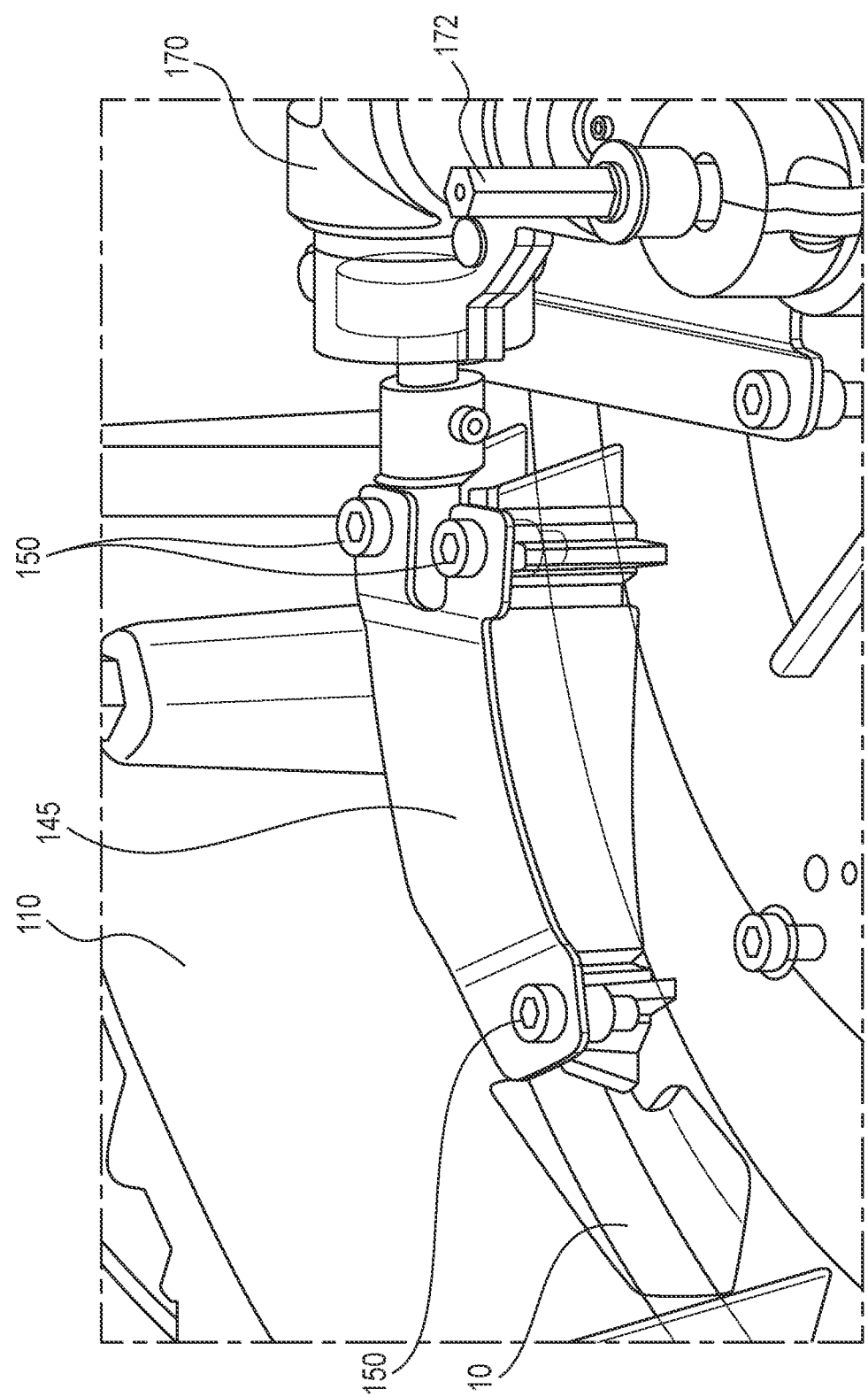
FIG. 11 is an enlarged, detailed view of an embodiment of a cable retention assembly optionally used in the drain cleaning apparatus of the present subject matter.

Positioned within drum housing 50 (FIG. 10) is rotatable cable carrier 110 (FIG. 9). There are several functions for internal cable carrier 110. A primary function is to store drain cleaning cable 10 (FIG. 9) when not in use, and a secondary function is to allow for smooth extension of drain cleaning cable 10 from drum housing 50 when in use. FIG. 9 depicts a schematic cross section of drum housing 50, which contains drain cable carrier 110. Cable carrier 110 is rotatably mounted within an interior region of drum housing 50. Cable carrier 110, typically circumferentially shaped, includes a rear wall 112 and a circumferential side wall 114. As previously noted, cable carrier 110 is rotatably supported within drum housing 50 by lazy susan bearing 100. One or more bushings 132 can be used to promote rotation of input shaft 172 about axis Y (FIG. 9) independently from drum housing 50. Such bushing(s) 132 may also serve to provide rotational support of input shaft 172. In particular versions of the present subject matter, a distal face 172A of input shaft 172 is located below plane X of front wall 52 as shown in FIG. 9. Input shaft 172, a component of transmission assembly 170, is shown in FIGS. 10, 11 and 13. The illustrated configuration reduces potential for damage to the input shaft 172 particularly when the drum housing 50 is positioned horizontally on its front wall 52. Also, when the drum housing 50 is positioned horizontally on its rear wall 54, the front wall 52 or plane X constitutes the highest location of the drum housing 50.

The cable carrier 110 can be configured to provide a cable channel 116 in which the drain cleaning cable 10 is stacked or coiled, which is illustrated in FIG. 9. The cable channel 116 is typically located alongside an interior face of the circumferential side wall 114 and in many versions between the circumferential side wall 114 and a secondary internal side wall 113. In these versions, the side walls 113 and 114 extend transversely from the rear wall 112. In certain embodiments, the secondary internal side wall 113 is typically concentrically positioned within the other side wall 114 and is spaced therefrom by a radial distance R. Thus, in these versions, R constitutes a width dimension of the cable channel 116. The rear wall 112 can also include a depression or recessed receiving region to facilitate retaining of the drain cleaning cable 10 near the side wall 114. FIG. 9 further illustrates the bearing assembly 100 with races 102, 104 rotatably supporting the cable carrier 110 within the interior of the drum housing 50.

In particular embodiments, cable channel 116 is sized to reduce potential of adjacent regions of cleaning cable 10 from laying immediately alongside each other with relatively large areas of contact occurring between cable regions. Such a configuration can lead to "pinching" of cable 10 within cable channel 116 and in may result in cable entanglement. As noted, cable channel 116 is preferably sized to exhibit a width R that promotes staggered stacking of the drain cleaning cable 10 within cable channel 116. In particular versions, the width R of cable channel 116 is within a predetermined range defined in Formula (I) of from about 1 to 2 times an outer diameter D of cleaning cable:

$$|1.0 \times D < R < 2.0 \times D \qquad (I)$$

As noted, D is an outer diameter of sheath 14 of cable 10 (FIG. 1) used in connection with the present subject matter. It will be understood that such an outer diameter for the sheath is not limited, and includes other configurations and widths for the cable channel.

FIG. 10 depicts yet another view of drum housing 50 with inner cable carrier 110 (FIG. 9) removed. Thus, in FIG. 10 the transmission assembly 170 and a cable retention platform (described in greater detail herein) are shown "floating." Underneath the rotatable cable carrier 110 (not shown in FIG. 10), i.e., along the rear wall 54, are a plurality of optional wear pads 140, typically made from a suitable polymeric material. Typically, wear pads 140 are formed from material exhibiting a relatively low coefficient of friction. In this regard, wear pad materials typically exhibit a coefficient of friction that is less than a coefficient of friction of drum housing materials. Such wear pads 140 are moreover configured to make contact with a rotating cable carrier 110 in the event that drain cable carrier 110 is stressed and contacts an interior surface of drum housing 50. In many versions, such wear pads 140 are raised and extend above adjacent surface(s) of the interior surfaces of drum housing 50, depicted in FIG. 10 as surfaces 51. Such wear pads 140 could also serve a structural function. For instance, if a drain cleaning machine is dropped or otherwise stressed, the pads 140 make contact with the cable carrier 110 to safely redirect forces to drum housing 50. Such pads 140, either glued or otherwise permanently fixed to an interior surface of housing 50, could also be fastened mechanically. Those skilled in the art will of course have certain methods of mounting such pads, for enabling pads 140 to be replaced easily. FIG. 10 also depicts at least one clamp plate 103. Clamp plate 103 is located between drum housing 50 and inner race 104 of bearing assembly 100. At least one clamp plate 103 serves to distribute loads and other forces between bearing assembly 100 and drum housing 50.

In certain embodiments, the present subject matter also includes a cable retention assembly. For this purpose, FIG. 11 depicts an end of drain cleaning cable 10 within cable carrier 110, with carrier 110 being rotatably supported in drum housing 50. A plate 145 (FIG. 11) or fastening component could be used to assist in securing drain cleaning cable 10 within drain cable carrier 110, and particularly along the rear wall 112 of the cable carrier 110. The purpose of such rear wall 112, in addition to securing the cable, is to reduce an amount of unrestricted cable in the system. The more securely fastened the drain cleaning cable 10, the less is the potential for the cable to "flip over" or undesirably twist when the drain cleaning cable 10 encounters difficult obstructions. Plate 145 is designed to be removable, to facilitate replacement and/or removal of drain cleaning cable 10. Also, plate 145 may or may not be secured to cable carrier 110 using a bolted connection or conventional self-tapping screws 150. Plate 145 is thus typically positioned over sheath 10 for causing interference, thereby holding sheath 14 in place.

Figure 12:
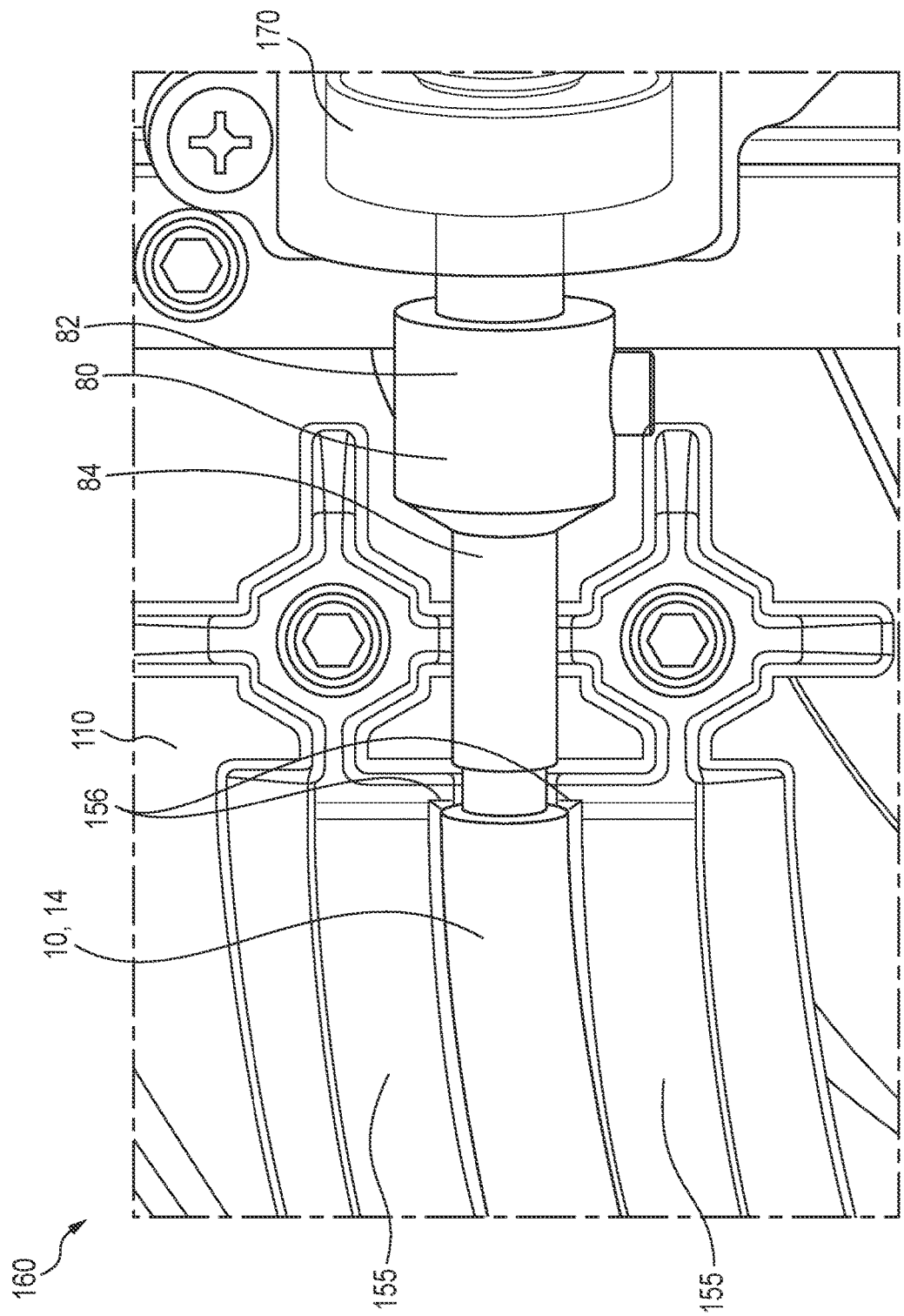
FIG. 12 is a further enlarged, detailed view of an embodiment of a cable retention platform optionally used with the drain cleaner of the present subject matter.

Referring to FIG. 12, cable carrier 110 could also include a cable retention component 160 having an integrated geometry within cable carrier 110, and configured to constrain and direct drain cleaning cable 10 to a channel such as cable channel 116 (FIG. 9) housing the remainder of drain cleaning cable 10. Component or platform 160, called a cable "retention platform," enables a length of drain cleaning cable 10 to take the largest possible bend relative to location of transmission 170 and/or gearboxes.

In a top view of the cable retention platform 160, schematically illustrated in FIG. 12, one or more lips 155 and/or one or more raised wall regions 156 enable a user to correctly insert and seat drain cleaning cable 10 in platform 160 in such a way that sheath 14 does not contact coupling 80, which rotates as transmission assembly 170 rotates cable 10. The lips 155, which serve to limit lateral movement of cable 10, are typically spaced apart from one another by a distance that is sufficient to receive drain cleaning cable 10 disposed therebetween. Raised wall sections 156 locate the sheath 14, thus assembled. Wall sections 156 prevent sheath 14 from contacting the rotating crimped fitting 80 (FIG. 7A) of cable 10. The structural components of the cable retention platform 160 such as lips 155 and/or walls 156 are advantageously formed integral with, or otherwise removably affixed to, rear wall 112 of cable carrier 110. It will be appreciated by those of ordinary skill in the art that the present subject matter could include numerous other configurations for the cable retention platform 160. Furthermore, it will also be understood that the present subject matter includes devices, apparatuses, and/or systems that do not utilize such components and/or platforms.

Transmission

The devices, machines, apparatuses and systems of the present subject matter also comprise an assembly for transferring rotary power from a drill or other power source to drain cleaning cable 10. Transmission assembly 170 allows a user to maintain a stationary location at which a power drill or other power source is connected. In many embodiments, transmission assembly 170 includes an input component 172 (FIG. 9) that will rotate, but not translate, with respect to a system during use of such system. Transmission assembly 170 also comprises an output component 174 (FIG. 13) for delivering rotary power to an end portion 80 (FIGS. 7A, 12) of drain cleaning cable 10 within an interior region of drum housing 50 and more particularly within cable carrier 110. The transmission is generally shown as transmission 170 in referenced figures.

A wide array of rotary power sources can be coupled to the input component 172 of transmission assembly 170 for providing rotary power to transmission assembly 170 and ultimately to cleaning cable 10. Powered hand held tools such as drills can be used. Although battery powered drills are preferred for many applications, corded drills can also be used. Other portable rotary power sources can also be used. In addition, impact power tools can be used to supply rotary power to the transmission assembly.

In many embodiments, the input component or shaft 172 of the transmission assembly 170 is located and accessible along the front wall 52 of the drum housing 50. And, in particular versions, the input shaft 172 is located at a central location along the front wall 52 of the drum housing 50, such as shown in FIG. 2A. Positioning the input shaft 172 at a central location and orienting the shaft 172 to rotate about an axis Y as shown in FIG. 9, that is parallel, coextensive, or coaxial with an axis of rotation of the cable carrier 110, results in improved operational efficiencies and additional benefits.

Referring to FIG. 13, transmission assembly 170 can additionally comprise one or more gears, to redirect power from a rotary power source selected from above mentioned user supplied devices. Transmission assembly 170 thus may use at least one belt. The present subject matter thus includes several alternative configurations. The input shaft 172 may be in the form of a hex shape shaft that accepts a multipoint Jacob's chuck from the user supplied power source, for example. The present subject matter can include still other configurations for the input shaft. Non-limiting examples of other configurations for the input shaft 172 include shaft cross sectional shapes that are square, triangular, round, oval, and other shapes. Rotary power could be transferred from an input shaft, through a series of gearboxes comprised of miter, bevel, or spiral bevel gears, for example, and next redirected to an output shaft or component 174 and thereafter ultimately to a crimped fitting on drain cleaning cable. Such drain cleaning cable could be coupled to an output shaft on a gearbox using a pin or shoulder screw. In many versions, it may be preferred to couple drain cleaning cable to an output shaft on a gearbox with a headed detent pin. The present subject matter includes various other coupling arrangements including shear pins and such as are known in the art.

FIG. 13 shows an example of an internal transmission 170, comprising two 90 degree gearboxes 175, 180 coupled together with drive 185 and optional spring or shear pins, screws, or keys. Transmission or drivetrain 170 transfers rotary power applied at input shaft 172 such as by, e.g., a drill, to coupling or fitting 80 of cable 10.

Brackets 190, used to orient gearboxes 175, 180 in a desired direction for operation, are fastened to cable carrier 110. Due to the fact that brackets 190 are fastened to cable carrier 110, the transmission component(s) will rotate with cable carrier 110 as the cable 10 is pulled from housing 50.

In certain versions, the transmission 170 as depicted in FIGS. 10-13, is oriented such that the rotational axis B of the output 174 extends at a non-transverse angle with respect to the axis Y of the input shaft 172. Referring to FIG. 9, the non-transverse angle between rotational axis B of the output 174 and the axis Y of the input 172 is typically within a range of from 91° to 135° and generally from 95° to 125°.

The transmission 170 in the apparatuses and systems of the present subject matter may optionally comprise a clutch. The clutch may or may not be adjustable, but is configured to disengage rotary power from a user supplied input device to either input gearbox 175 and/or 180 or after gearbox 175 and/or 180 between input 172 and drive coupling 80. In many embodiments, the clutch selectively disengages or interrupts rotary power transfer from a rotating input component to cable 10. Alternatively or in addition, one or more shear pin(s) can be used in the drivetrain. Clutches and/or shear pin(s) can be located between the coupling and the gearbox shaft, between gearboxes, and/or between the input shaft and the external power source which can be a drill.

The present subject matter also provides various methods of drain cleaning using the systems described herein. Generally, the methods comprise providing a drain cleaning apparatus or device with one or more drain cleaning cables as described. A distal end of the cable, typically also including a tool attached thereto, is inserted into a drain or sewer line, or other component of interest. As will be understood, the proximal end of the drain cleaning cable is attached to the transmission of the drain cleaning system. The method also comprises rotating the cleaning cable to thereby rotate the tool. Typically, rotation is performed by rotatably driving the input of the transmission using a drill or other source of rotary power. The method may additionally comprise extending or advancing the drain cleaning cable relative to the drain cleaning system.

The drain cleaning systems of the present subject matter can be used with a wide array of tools, components, and accessories. For example, in certain applications, drain cleaning systems can be used with so-called "knockers" which are conventional tools typically attached at a distal end of drain cleaning cable and used to effectively clean rust, dirt, and/or debris from a pipe or drain line. Most knockers include one or more sections of chain which are flung radially outwardly as such an end-tool is rotated. One or more carbide inserts can be brazed or otherwise attached to the chain sections to promote cleaning and reduce wear otherwise occurring on the chain surfaces.

In many embodiments, the drain cleaning apparatuses of the present subject do not include an internal power source such as an electric motor, which would for example be mounted within the drum housing or otherwise mounted on the device. Thus, in these embodiments, the drain cleaning apparatuses are free of a power source such as internal or integral power sources such as for example electric motors.

Transmission Array

Figure 14:
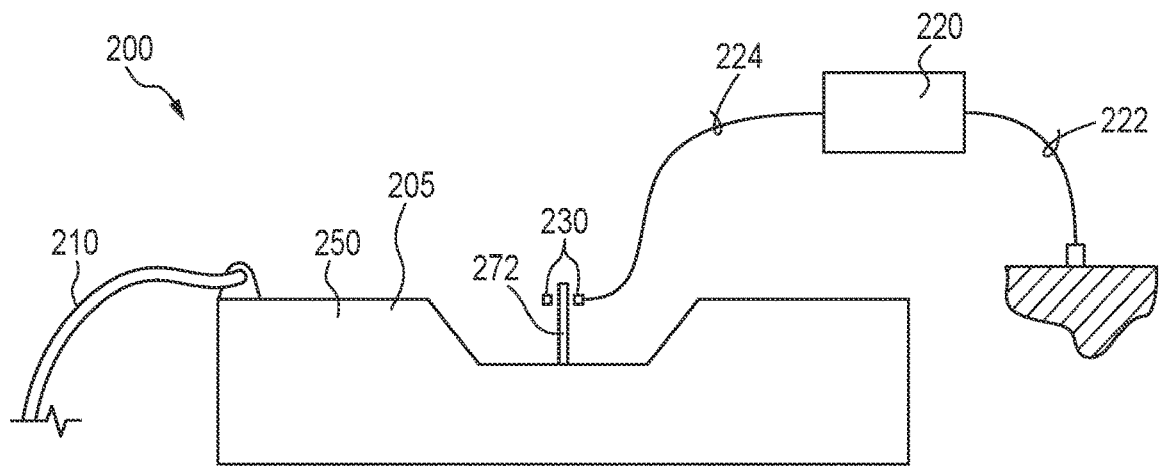
FIG. 14 is a schematic view of an embodiment of a signal transmission system including a transmitting array in accordance with the present subject matter.
Figure 15:
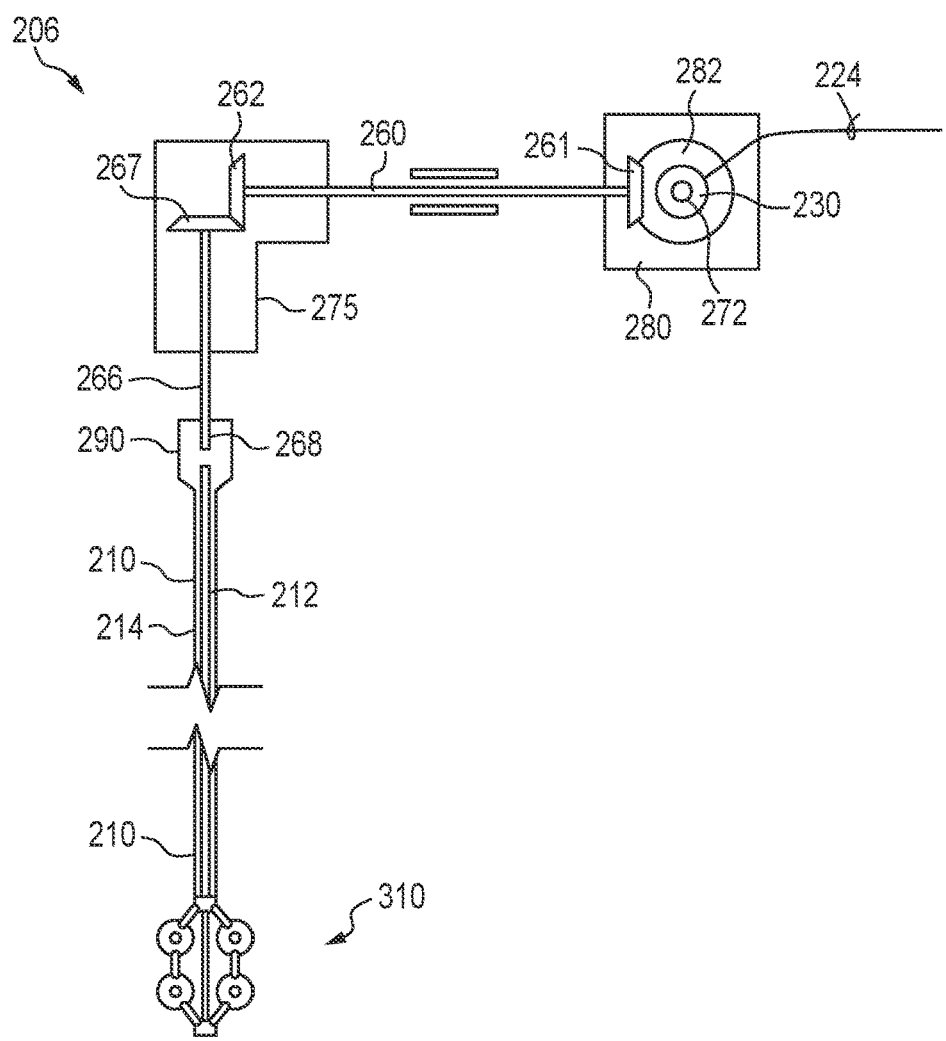
FIG. 15 is a schematic view of an illustrative embodiment of a drivetrain apparatus used in connection with a signal transmission system shown in FIG. 14.

FIG. 14 is a schematic of an embodiment of a controlled signal transmission system 200, in which the system 200 is provided with a controlled signal transmitting array as disclosed in this application. For the presently illustrated embodiment, system 200 comprises a drain cleaning machine 205 which includes a signal transmitter 220. Drain cleaning machine 205 typically includes a drum housing 250 that encloses or retains the components and assemblies of an above-described drain cleaning machine (FIGS. 9-13) and includes an appropriate length of drain cleaning cable 210 stored at least partially within drum housing 250. The drain cleaning machine 205 includes an input shaft 272 where rotary power is applied. The illustrated signal transmitter 220 is a commercially available line transmitter, of the sort well known in the art. For purposes of describing operation of the present subject matter, signal transmitter 220 is in electrical connection (also referenced as "electrical communication") with the input shaft 272 via a so-called "transmitter clip" or "rotary contact" referred to hereinafter as bearing 230 (FIGS. 14, 15). An electrical conductor 224 provides electrical communication between the bearing or rotary contacts 230 and transmitter 220. A ground conductor 222 provides grounding for the transmitter 220, as illustrated in FIG. 14. Transmitter 220 is connected to drain cleaning machine 205 and particularly to the input shaft 272 through the bearing (also herein called a "lug") or other rotary contact 230, enabling input shaft 272 to be rotated while an electrical signal is transmitted between transmitter 220 and input shaft 272. Since the present subject matter makes use of a signal (a controlled form of electrical current) when using a bearing as a component of an electrical circuit, the present subject matter is distinguishable from U.S. Pat. No. 10,160,232 to Griffin et al., which discloses using a bearing as a component of an electrical circuit in an ink jet printer to eliminate build up of static electricity (an arbitrary electrical current) on a transport belt of an ink-jet printer during printer operation. Such build up of static electric charge will generally cause an uncontrolled spurt or brief blast of electrical discharge from the belt during printer operation which results in undesirable print quality. The present subject matter is also easily distinguished from U.S. Pat. No. 8,444,567 to Satoh, which discloses an ultrasonic diagnostic apparatus used for reducing uneven rotation of a flexible shaft. For example, the Satoh patent does not even suggest using a bearing for any purpose.

FIG. 15 is a schematic view of an embodiment of a drivetrain 206 used in the system 200 shown in FIG. 14. The drivetrain 206 is typically enclosed within the drum housing 250 of the drain cleaning machine 205. Specifically, the drivetrain 206 includes the previously noted input shaft 272, a first gear 282 engaged with the input shaft 272, and a second gear 261 engaging first gear 282 and coupled to a first drive member 260. The first and second gears 282 and 261 advantageously can be in the form of a ring-and-pinion gear assembly, respectively. The gears 282 and 261 are in meshed engagement such that rotation of the input shaft 272 results in rotation of the first drive member 260. The gears 282, 261 and other components are typically located within a gearbox 280. FIG. 15 also illustrates the previously noted rotary contact(s) 230 in electrical communication with the input shaft 272, and the electrical conductor 224 extending between the rotary contact(s) 230 and the transmitter 220 (FIG. 14). The drivetrain 206 further includes a second drive member 266, which is in geared engagement with or otherwise coupled to the first drive member 260, such that rotation of the first drive member 260 results in rotation of the second drive member 266. Such geared engagement or coupling can occur via the gear 262 on the first drive member 260 in meshed engagement with yet another gear 267 on an end portion of the second drive member 266. The operatively intermeshed gears 262, 267 and other components are typically located within a second gearbox 275. In many versions, second gearbox 275 and/or gears 262 and 267 are preferably configured such that first drive member 260 is transversely oriented relative to second drive member 266. However, it will be understood that the present subject matter includes a wide array of other arrangements and orientations of such drivetrain components. The second drive member 266, and particularly an output end portion 268 of second drive member 266, is operatively engaged or otherwise coupled to drain cleaning cable 210 via a coupling 290. As previously described, drain cleaning cable 210 includes a rotatable internal coiled wire or core 212 enclosed by an outer sheath 214 which does not rotate with the internal coiled wire or core 212. Disposed at a distal end portion of drain cleaning cable 210, is a so-called "work" tool 310 which be in the form or shape of a conventional and often referred to as (or called) a "chain knocker" for instance. Accordingly, an electrical circuit is formed by select components of the signal transmission system 200 (FIGS. 14, 15) as follows. The coupling 290 electrically connects the a work tool 310 (such as a chain knocker) to the second drive member 266 via drain cleaning cable 210. Second drive member 266 is electrically connected to the first drive member 260 via the electrically and operatively intermeshed gears 262, 267. The first drive member 260 is electrically connected to the input shaft 272 via the electrically and operatively intermeshed gears 261 and 282. In addition, the input shaft 272 is electrically connected to the transmitter 220 via the bearing (e.g., rotary contact 230) and electrical conductor 224. In operation, signal transmitter 220 (FIG. 14) sends a controlled (i.e., known type of wave form such as saw-tooth, square-wave, etc.) to the work tool 310. The work tool 310, turn, will make contact with an internal feature, point of interest, or obstruction within pipelines, sewers, or other constructs (located, e.g., underground or through walls) into which the work tool 310 has been inserted. Such internal features, points of interest or obstructions can be one or more of any of the following: a pipe tee, a pipe bend, a tree root, tree branches and twigs, leaves, other organic materials shed by trees, and various fluids (including wastes), for example. The work tool 310, upon contacting such an internal feature, point of interest, or obstruction will relay a signal back to the transmitter via the electrical circuit described above. Such electrical so-called "relay" signals, are relayed to the transmitter 220, and can advantageously be analyzed by current software applications to characterize and identify internal features and obstructions sensed by the work tool 310. For instance, US Patent Application 2021/0041348 to Parrott et al. discloses one such contact-type of sensor. In this regard, the work tool 310 serves as such a contact-type of "sensor" and various other components of the signal transmission system 200 serve as an electrical circuit to enable sensed signals to be analyzed for characterizing internal features, points of interest, or obstructions for a user drain cleaning machinery equipped with various other versions of signal transmission system 200 of the present subject matter. In addition to work tool 310 (e.g., "chain knocker"), the present subject matter includes the use of other tools and components including cameras, camera heads, and/or sondes, all of which could be used in combination with work tool 310. Summarizing the above, work tool 310 is a contact-type sensor that relays a controlled signal sent by transmitter 220, after physically contacting an internal feature, point of interest, or obstruction returns (or relays) the signal back to transmitter 220 for analysis.

Drivetrain 206 is electrically conductive such that electrical communication can occur between the input shaft 272 and the output end 268 portion of the second drive member 266. In order to be operative for the intended purpose, it is therefore necessary for all or select portions of the components of the drivetrain 206 be formed from electrically conductive materials. In particular, the input shaft 272, the first and second gears 282 and 261, the first drive member 260, the additional above-described gears 262 and 267, and the second drive member 266 are all electrically conductive.

In most of the embodiments, the coupling 290 is preferably also electrically conductive. This allows for electrical communication between the output end 268 of the second drive member 266 and the internal coiled wire 212 of drain cleaning cable 210.

Figure 16:
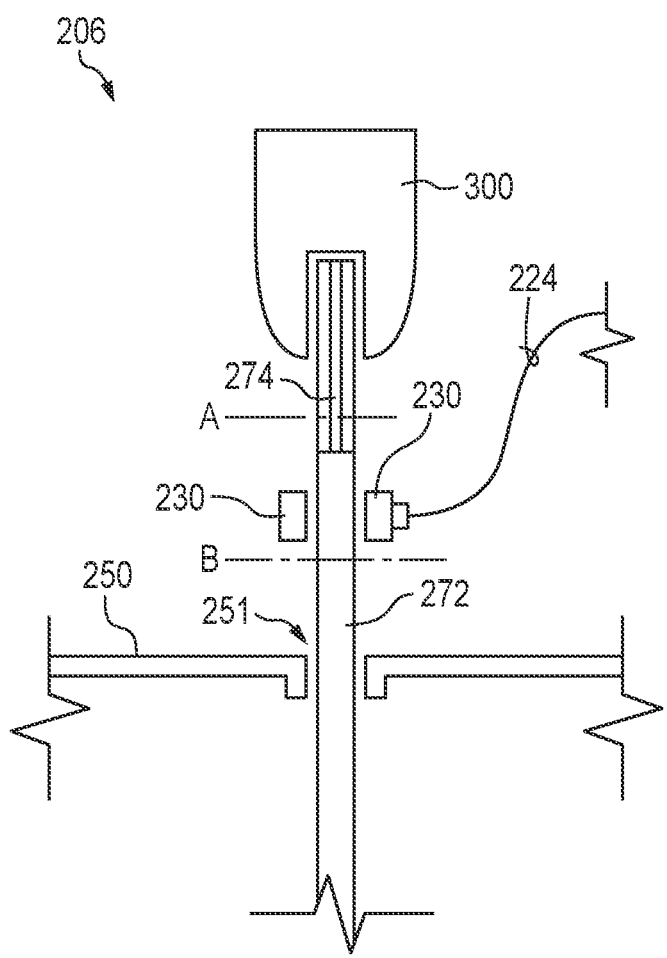
FIG. 16 is a portion of a detailed schematic view, on an enlarged scale relative to FIGS. 14 and 15, further depicting a portion of the drivetrain in FIG. 15.
Figure 16A:
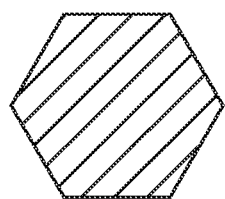
FIGS. 16A and 16B are cross sectional views, on an enlarged scale relative to aspects or features of a certain input component of the drivetrain, depicted in FIG. 16.
Figure 16B:
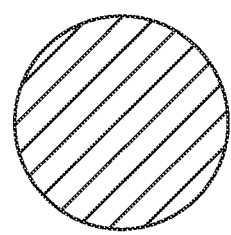

FIG. 16 is a detailed schematic view illustrating a portion of the drivetrain 206 shown in FIG. 15. Specifically, FIG. 16 depicts the input shaft 272 extending from the drum housing 250 of a drain cleaning machine (as shown in FIG. 14). The input shaft 272 extends through an aperture 251 defined in the drum housing 250. Typically, the input shaft 272 preferably includes a length portion 274 that is not circular in cross section, but rather where the is, e.g., polygonal in shape and typically could be hexagonal in cross section. FIG. 16A illustrates a such hexagonal cross section taken along plane "A" intersecting the length portion 274 of input shaft 272. However, it will be understood that the present subject matter includes other cross sectional shapes for the length portion 274. Nonetheless, the hexagonal cross sectional shape advantageously promotes gripping and/or engagement by a conventional rotary power source 300 which can, e.g., be a handheld electrically powered drill. FIG. 16 also schematically illustrates above-described rotary contacts 230, described above as being in electrical contact with input shaft 272. As noted above, rotary contacts 230 are also in electrical contact or communication with electrical conductor 224. Rotary contacts 230 are located along input shaft 272 at, or substantially at, a location at which a cross section of input shaft 272 is circular. FIG. 16 depicts such a location where plane B intersects input shaft 272. FIG. 16B illustrates a resulting circular cross section of input shaft 272 taken at plane B.

The present subject matter also advantageously provides proven methods for determining or otherwise assessing location(s) of conduits, pipes, or other constructs. Typically, the methods comprise providing a system including (i) a machine having a rotatable drum, an input shaft for receiving rotary power, and a cable extending from the machine, and (ii) an electrical transmitter in electrical communication with the input shaft of the machine and capable of transmitting a controlled electrical signal that provides to a user select information involving, e.g., debris or other blockage, obstructions including bends or walls, found within conduits, pipes, or other constructs, whether located under the ground or located above ground, but inaccessible. To provide such information via signal, the drain cleaning cable includes an inner rotatable shaft or coiled wire core and includes an outer sheath extending about the inner core. Upon the input component or shaft 272 (FIGS. 14, 15) receiving rotary power, the inner coiled wire core rotates about an axis. The input shaft 272 of drain cleaning machine 205 (FIG. 14) is in electrical communication with the drain cleaning cable 210 (FIG. 14). The methods also comprise actuating the electrical signal transmitter 220 to thereby energize the internal coiled wire 212 of drain cleaning cable 210 (FIG. 15). This causes an electromagnetic field to emanate from thus energized coiled wire 212. Methods additionally comprise sensing and transmitting to an operator of the drain cleaning machine 205 the electromagnetic field sensed and emanating from thus energized inner coiled wire 212. Typically, rotary power is applied to the input shaft of the drain cleaner to thereby impart rotation to the inner coiled wire. In many operations, the inner coiled wire is rotated while also being energized. Sensing is performed using a locator device as described herein. Additional methods include extending or retracting drain cleaning cable within (or from) a conduit, pipe or other member. Such cable displacement can occur while determining location.

Examples

Trials and investigations were performed to further demonstrate aspects of the present subject matter.

A drain cleaning machine equipped with a drain cleaning cable, as described above, included: A transmitter lug capable of transmitting a controlled electrical signal to a rotating shaft. The lug was mounted on a rotatable input shaft of the drain cleaning machine. A RIDGID 305R Transmitter was electrically connected to the transmitter lug (also called a "transmission assembly" in this patent application). Next, a transmitter ground of the RIDGID 305R Transmitter was electrically connected to a ground spike.

Rotation was imparted to the drain cleaning cable extending from the drain cleaning machine by engaging a handheld electrically powered drill to the input shaft, and actuating the drill to thereby rotate the inner coiled wire core of the drain cleaning cable while the outer sheath remained stationary. Thus rotatable drain cleaning cable was introduced into a four (4) inch PVC line, buried at a depth of about two (2) feet.

Upon energizing the drain cleaning cable by using as a transmitter, a RIDGID SR-24 Line Locator, resulted in identifying the location of the cable within the PVC line. The full length of the drain cleaning cable was detected or located without a significant drop in signal strength from the signal transmitter assembly. Locating underground obstructions was still possible while operating the drain cleaning machine, i.e., rotating the input shaft and drain cleaning cable. Additional underground information included confirmation of a "knocker end" on a distal end of the drain cleaning cable, identified when a noticeable drop in signal strength occurred as the locator was pulled away.

It is contemplated that similar practices and techniques could be performed in metal or cast iron pipes, conduits, or lines; but may involve a reduced signal strength. And therefore, locating or mapping could be more difficult but would still be possible.

The present subject matter provides numerous advantages and/or benefits, and particularly in view of prior art equipment and methods. The same cable, e.g., a conventional cable having an inner rotatable shaft or coil of wound wires surrounded by an outer sheath, could be used to clean underground conduit and locate or map obstructions. Signals such as electromagnetic signals, can be read, monitored, or otherwise sensed during a cleaning application, enabling a user to track advancement of the cable. Also, an electrical transmitting line or conductor can be added to a drain cleaning machine without major modification and even perhaps with no modification.

Although the drivetrain is described herein as using an input shaft to which a source of rotary power is applied, it will be understood that the present subject matter includes the use of a rotational style connection assembly or joint able to which provide concurrent transfer of both rotary power and electrical energy/signals. A rotating joint would allow an input shaft to rotate while an electrical signal transmits information to an operator of the drain cleaning machine information about underground pipe, conduit and other constructs. This may eliminate need for previously described rotary contacts.

Many other benefits will no doubt become apparent to those skilled in the art from future development of, and improvements to, the subject matter this technology.

All patents, patent applications, best practices, engineering standards, and technical articles noted herein are hereby incorporated by reference in their entirety.

The present subject matter includes all possible operable combinations of features and aspects described herein. Thus, for example if a first feature is described in association with a first embodiment and another feature is described in association with another embodiment, it will be understood that the present subject matter includes embodiments stemming from a combination of both such features and embodiments.

As noted above, the present subject matter solves many of the problems that have been associated with previous strategies, systems and/or devices. However, it will be appreciated that various changes in the details, materials, machines, and their associated components, described hereinabove and illustrated to show the nature of the present subject matter, may be made by those skilled in the art without departing from the principle and scope of the present subject matter, as set forth in appended claims.

What is claimed is:

1. A method for determining location of a conduit, pipe or other construct, wherein the method comprises:
providing a system including (i) a machine having a drum, an input shaft for receiving rotary power, and a cable extending from the machine, the cable including an inner rotatable core and an outer sheath extending about the inner core, wherein upon the input shaft receiving rotary power, the inner core rotates independently from the outer sheath, and (ii) an electrical signal transmitter in electrical communication with the input shaft of the machine, wherein the input shaft of the machine is in electrical communication with the cable;
actuating the electrical transmitter to thereby energize the inner core; and
sensing an electromagnetic field emanating from the energized inner core.

2. The method of claim 1 further comprising:
applying rotary power to the input shaft of the machine to thereby impart rotation to the inner core independently from the outer sheath.

3. The method of claim 2 whereby the inner core is rotated while also being energized.

4. The method of claim 1 wherein the sensing is performed using a locator device.

5. The method of claim 1 further comprising:
extending the cable into a conduit, pipe or other construct.

6. A system for determining location of a conduit, pipe or other construct, the system comprising:
a machine having a drum, an input shaft for receiving rotary power, and a cable extending from the machine, the cable including an inner rotatable core and an outer sheath extending about the inner core, wherein upon the input shaft receiving rotary power, the inner core rotates independently from the outer sheath, and an electrical signal transmitter in electrical communication with the input shaft of the machine, wherein the input shaft of the machine is in electrical communication with the cable.

7. The system of claim 6 further comprising:
a first drive member configured to transfer the rotary power and the electrical signal from the input shaft.

8. The system of claim 7 further comprising:
a second drive member configured to transfer the rotary power and the electrical signal from the first drive member.

9. The system of claim 8 further comprising:
a coupling configured to receive an end of a cable having the inner rotatable core and the outer sheath, wherein the coupling is also configured to transfer the rotary power and the electrical signal from the second drive member to the inner core of the cable received in the coupling.

10. The system of claim 6 wherein the input shaft includes a first region at which a cross section of the input shaft is circular, and a second region at which a cross section of the input shaft is non-circular.

11. The system of claim 10 wherein the non-circular shape of the input shaft is a polygonal shape.

12. The system of claim 7 wherein the input shaft and the first drive member are in rotational engagement and electrical communication with each other by a plurality of respective meshing gears.

13. The system of claim 8 wherein the first drive member and the second drive member are in rotational engagement together and in electrical communication with each other by a plurality of respective meshing gears.

14. The system of claim 9 wherein the cable defines a proximal end at which the cable is received and engaged to the coupling, and a distal end opposite the proximal end, wherein the system further comprises:

a contact-type sensor disposed at the distal end of the cable.

15. The system of claim 14 wherein the contact-type sensor is a work tool.

* * * * *